United States Patent
Cui

(10) Patent No.: US 11,997,716 B2
(45) Date of Patent: May 28, 2024

(54) ELECTRONIC DEVICE FOR WIRELESS COMMUNICATION SYSTEM, METHOD AND STORAGE MEDIUM

(71) Applicant: Sony Group Corporation, Tokyo (JP)

(72) Inventor: Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/305,400

(22) Filed: Apr. 24, 2023

(65) Prior Publication Data

US 2023/0262771 A1    Aug. 17, 2023

Related U.S. Application Data

(63) Continuation of application No. 17/258,451, filed as application No. PCT/CN2019/099403 on Aug. 6, 2019, now abandoned.

(30) Foreign Application Priority Data

Aug. 10, 2018    (CN) .......................... 201810908619.0

(51) Int. Cl.
    *H04W 74/0816*    (2024.01)
    *H04L 1/1812*     (2023.01)
    *H04W 74/00*      (2009.01)
(52) U.S. Cl.
    CPC ....... *H04W 74/0816* (2013.01); *H04L 1/1819* (2013.01); *H04W 74/008* (2013.01)
(58) Field of Classification Search
    CPC ........... H04W 74/0816; H04W 74/008; H04W 74/0808; H04W 72/0446; H04W 72/23;
    (Continued)

(56) References Cited

U.S. PATENT DOCUMENTS

| | | | |
|---|---|---|---|
| 2017/0302493 | A1 | 10/2017 | Yang et al. |
| 2018/0124749 | A1 | 5/2018 | Park et al. |

(Continued)

FOREIGN PATENT DOCUMENTS

| | | |
|---|---|---|
| CN | 101197643 A | 6/2008 |
| CN | 101568148 A | 10/2009 |

(Continued)

OTHER PUBLICATIONS

International Search Report and Written Opinion dated Oct. 29, 2019, received for PCT Application PCT/CN2019/099403, Filed on Aug. 6, 2019, 11 pages.

(Continued)

*Primary Examiner* — Mandish K Randhawa
(74) *Attorney, Agent, or Firm* — XSENSUS LLP

(57) ABSTRACT

The present disclosure relates to an electronic device for a wireless communication system, and a method and a storage medium. Described are various embodiments concerning resource configuration, resources access, and sending control. In one embodiment, an electronic device for a terminal side in a wireless communication system comprises a processing circuit. The processing circuit is configured to receive resource configuration information by means of at least one of radio resource control (RRC) signaling and physical layer signaling, wherein the resource configuration information indicates a resource allocated in an unlicensed band for the terminal to perform uplink transmission. The resource comprises one or more resources, and the resource configuration information comprising information of one or more offset points indicating positions of the one or more resources.

15 Claims, 18 Drawing Sheets

(58) Field of Classification Search
CPC ........ H04W 16/14; H04L 1/1819; H04L 1/08; H04L 1/1822
See application file for complete search history.

(56) References Cited

U.S. PATENT DOCUMENTS

2018/0176945 A1* 6/2018 Cao ................... H04L 5/0044
2019/0313442 A1* 10/2019 Hosseini ............. H04L 5/0091

FOREIGN PATENT DOCUMENTS

| CN | 105848165 A | 8/2016 |
|---|---|---|
| CN | 105992373 A | 10/2016 |
| CN | 106301733 A | 1/2017 |
| CN | 106797305 A | 5/2017 |
| CN | 107667565 A | 2/2018 |
| CN | 107852319 A | 3/2018 |
| KR | 20170093068 A | 8/2017 |
| WO | 2018/086541 A1 | 5/2018 |

OTHER PUBLICATIONS

Ericsson, "Multiple starting and ending positions for LAA UL", 3GPP TSG RAN WG1 Meeting #88bis, R1-1705451, Apr. 3-7, 2017, pp. 1-4.

LG Electronics, "Discussion on multiple starting and ending positions for LAA UL", 3GPP TSG RAN WG1 Meeting #88bis, R1-1704838, Apr. 3-7, 2017, 3 pages.

Nokia et al., "On channel access for autonomous UL access", 3GPP TSG-RAN WG1 Meeting #90, R1-1713861, Aug. 21-25, 2017, 5 pages.

* cited by examiner

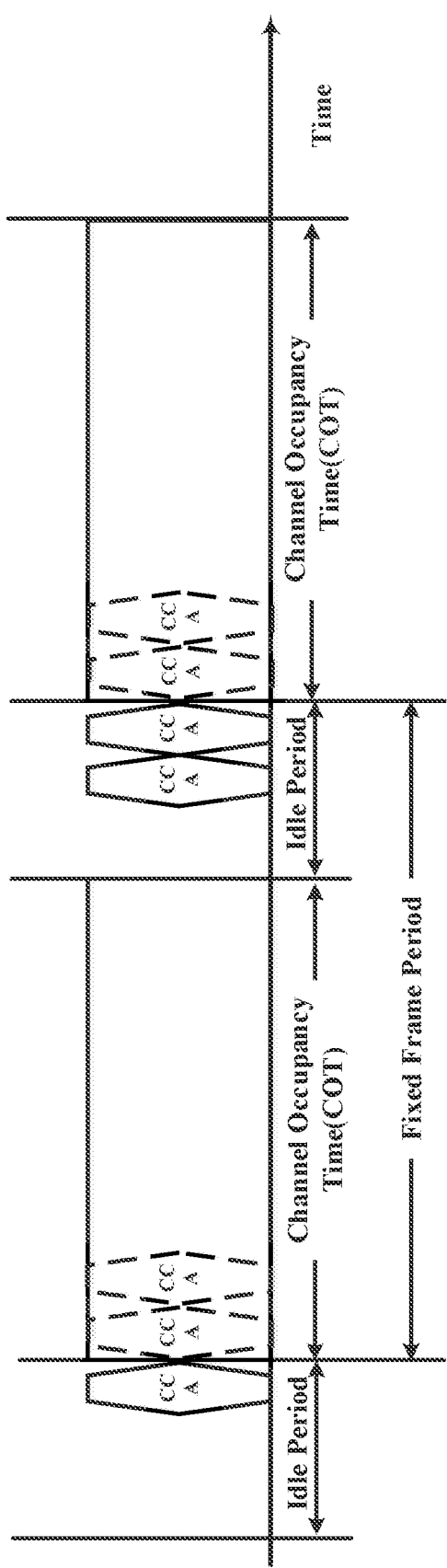
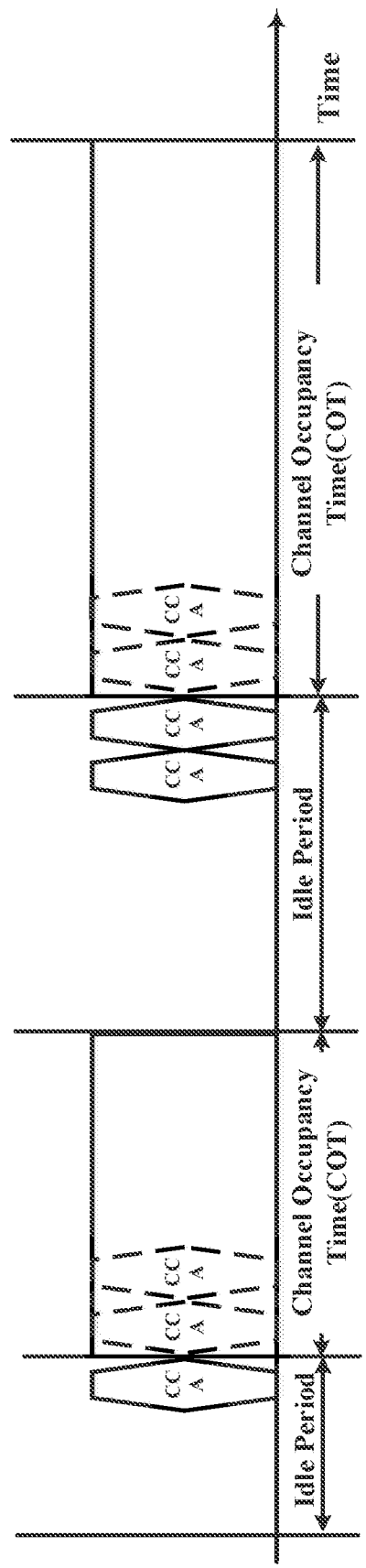
Fig. 4A
Fig. 4B

ELECTRONIC DEVICE FOR WIRELESS COMMUNICATION SYSTEM, METHOD AND STORAGE MEDIUM

CROSS-REFERENCE TO RELATED APPLICATIONS

The present application is a continuation of U.S. patent application Ser. No. 17/258,451, filed Jan. 7, 2021, which is based on PCT filing PCT/CN2019/099403, filed Aug. 6, 2019, which claims priority to CN 201810908619.0, filed Aug. 10, 2018, the entire contents of each are incorporated herein by reference.

TECHNICAL FIELD

The present disclosure generally relates to wireless communication systems, and specifically relates to technologies for resource configuration, resource access, and transmission control.

BACKGROUND

In recent years, applications of mobile communication technology have become increasingly widespread, and accompanying, there are increasingly demands for mobile data. These demands have prompted people to seek various improved technologies that can increase mobile data rates and throughput. Mobile communications traditionally operate on licensed spectrums, and mobile operators try to offload part of mobile data requirements to non-licensed spectrums by extending mobile communications to non-licensed spectrums. Related improved technologies include 3GPP LAA (License Assisted Access), FeLAA (Further Enhanced LAA), and related technologies in the 5G New Radio (NR) system. However, non-licensed spectrums were originally used by some wireless communication devices, including devices that comply with the 802.11 series standards. Therefore, in the improved technologies mentioned above, it is necessary to consider the coexistence issue of cellular wireless communication devices and original wireless communication devices in non-licensed spectrums.

SUMMARY

One aspect of the present disclosure relates to an electronic device for a terminal in a wireless communication system. According to one embodiment, the electronic device can comprise a processing circuitry. The processing circuitry can be configured to receive resource configuration information by at least one of radio resource control (RRC) signaling and physical layer signaling, wherein the resource configuration information indicates allocated resources in non-licensed spectrum for uplink transmission by the terminal. The resources comprise one or more resources, and the resource configuration information comprises information of one or more offsets indicating positions of the one or more resources.

One aspect of the present disclosure relates to an electronic device for a base station in a wireless communication system. According to one embodiment, the electronic device comprises a processing circuitry. The processing circuitry can be configured to transmit resource configuration information by at least one of radio resource control (RRC) signaling and physical layer signaling, wherein the resource configuration information indicates allocated resources in non-licensed spectrum for uplink transmission by a terminal. The resources comprise one or more resources, and the resource configuration information comprises information of one or more offsets indicating positions of the one or more resources.

One aspect of the present disclosure relates to an electronic device for a terminal in a wireless communication system. According to one embodiment, the electronic device comprises a processing circuitry. The processing circuitry can be configured to generate a parameter K for a number of repetitive transmissions of a same transport block in uplink; transmit the parameter K to a Base Station (BS); and repetitively transmit at least one transport block by K times.

One aspect of the present disclosure relates to an electronic device for a base station in a wireless communication system. According to one embodiment, the electronic device comprises a processing circuitry. The processing circuitry can be configured to receive a parameter K for a number of repetitive transmissions of a same transport block in uplink from a terminal; and receive K repetitive transmissions of at least one transport block from the terminal.

Some aspects of the present disclosure relate to wireless communication methods for a terminal side and/or a base station side.

Another aspect of the present disclosure relates to a computer-readable storage medium storing one or more instructions. In some embodiments, the one or more instructions can, when executed by one or more processors of an electronic device, cause the electronic device to execute the methods according to various embodiments of the present disclosure.

Yet another aspect of the present disclosure relates to various apparatus, comprising means or units for performing operations of various methods according to embodiments of the present disclosure.

The above summary is provided to summarize some exemplary embodiments to provide a basic understanding of various aspects of the subject described herein. Therefore, these features described above are merely examples and should not be construed as narrowing the scope or spirit of the subject matter described herein in any way. Other features, aspects and advantages of the subject matter described herein will become apparent from the following specific embodiments described in conjunction with the accompanying drawings.

BRIEF DESCRIPTION OF DRAWINGS

FIGS. 4A and 4B show exemplary LBT processes according to embodiments of the present disclosure;

The embodiments described in the present disclosure are only examples, and they can have various modifications and alternative forms. It should be understood that the drawings and their detailed description are not intended to limit the solutions to the specific forms disclosed, but to cover all modifications, equivalents, and alternative solutions that fall within the spirit and scope of the claims.

DETAILED DESCRIPTION

The following describes representative applications of various aspects such as the device and method according to the present disclosure. The description of these examples is only for adding context and helping to understand the embodiments described. Therefore, it is clear to those skilled in the art that the embodiments described below can be implemented without some or all of the specific details. In other cases, well-known process steps are not described in detail to avoid unnecessarily obscuring the embodiments described. Other applications are possible, and solutions of the present disclosure are not limited to these examples.

Figure 1:
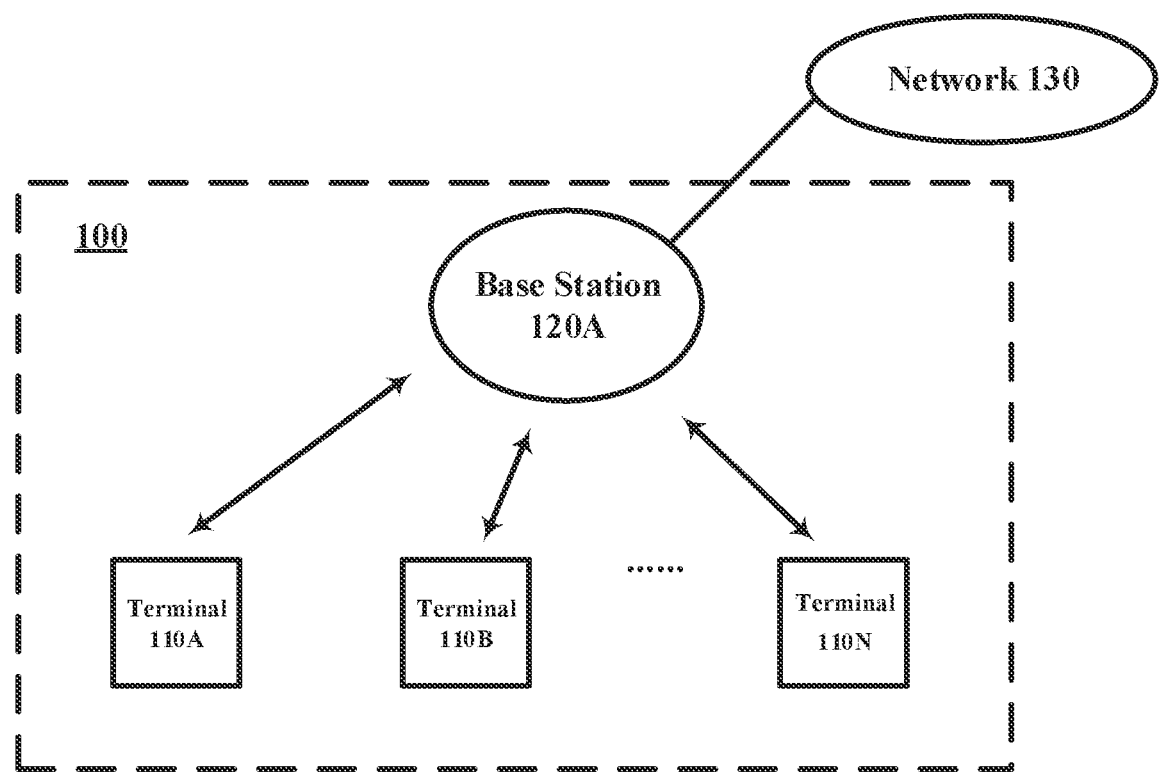
FIG. 1 shows an exemplary wireless communication system according to an embodiment of the present disclosure.

FIG. 1 shows an exemplary wireless communication system 100 according to an embodiment of the present disclosure. It should be understood that FIG. 1 only shows one of multiple types and possible arrangements of wireless communication systems; features of the present disclosure can be implemented in any of the various systems as required.

As shown in FIG. 1, the wireless communication system 100 includes a base station 120A and one or more terminals 110A, 110B to 110N, and the base station and the terminals can be configured to communicate through a transmission medium. The base station 120A can be further configured to communicate with a network 130 (for example, a core network of a cellular service provider, a telecommunication network such as a public switched telephone network (PSTN), and/or the Internet). Therefore, the base station 120A can facilitate communication between the terminals 110A to 110N and/or between the terminals 110A to 110N and the network 130.

It should be understood that the term base station herein has the full breadth of its general meaning, and at least includes a wireless communication station that is a part of a wireless communication system or a radio system to facilitate communication. Examples of base stations may include but are not limited to the following: at least one of a Base Transceiver Station (BTS) and a Base Station Controller (BSC) in a GSM system; at least one of a Radio Network Controller (RNC) and a Node B in a WCDMA system; an eNB in a LTE and a LTE-Advanced system; an Access Point (AP) in a WLAN and a WiMAX system; and a corresponding network node in communication systems to be or under development (for example, a gNB, an eLTE eNB, etc. in a 5G New Radio (NR) system). Part of the functions of the base station herein can also be implemented as an entity that has control capability on communications in D2D, M2M, and V2V communication scenarios, or as an entity that plays a role of spectrum coordination in cognitive radio communication scenarios.

The term terminal herein has the full breadth of its usual meaning, for example, a terminal can be a Mobile Station (MS), User Equipment (UE), etc. The terminal can be implemented as a device such as a mobile phone, a handheld device, a media player, a computer, a laptop or a tablet, or almost any type of wireless device. In some cases, the terminal can communicate using multiple wireless communication technologies. For example, the terminal can be configured to communicate using two or more of GSM, UMTS, CDMA2000, WiMAX, LTE, LTE-A, WLAN, NR, Bluetooth, etc. In some cases, the terminal may also be configured to communicate using only one wireless communication technology.

In FIG. 1, the coverage area of the base station 120A may be referred to as a cell. The base station 120A and other similar base stations (not shown) that operate according to one or more cellular communication technologies can provide continuous or nearly continuous communication signal coverage to terminals 110A to 110N and similar devices over a wide geographic area. In FIG. 1, terminals 110A to 110N can receive radio signals from neighboring base stations while receiving radio signals from base station 120A. In some embodiments, the terminal may maintain connections with multiple cells, for example, form a Dual Connectivity with a primary base station and a secondary base station. One of the multiple cells may be used as the primary cell of the terminal, and the other cell may be used as the secondary cell of the terminal. In one embodiment, some secondary cells can operate in non-licensed spectrums.

In an embodiment of the present disclosure, the base station and the terminal can communicate through both licensed spectrums and non-licensed spectrums. Licensed spectrums and non-licensed spectrums can follow the definition of industry standards or follow regional frequency management regulations. For both licensed spectrums and non-licensed spectrums, the base station can allocate time domain and frequency domain resources for uplink and downlink. Generally, frequency domain resources can be continuous or separated subcarriers; in non-licensed spectrums, frequency domain resources can also correspond to a certain bandwidth part. The time domain resources may correspond to a certain period, for example, may be a certain number of symbols, slots or subframes. In some embodiments, the allocation of time domain resources may involve indicating a starting point, an ending point, and additional offsets of the period. The additional offsets can increase the flexibility of resource allocation in the time domain.

In the embodiment of the present disclosure, the transmission scheme of transport blocks may be changed so that a same transport block can be repetitively transmitted multiple times. The transmission scheme can complete multiple transmissions and receptions of a single transport block in a short time, so that the transport block can be processed faster (for example, compared to normal Hybrid Automatic Repeat Request (HARQ) processing) for receiving and decoding correctly. In non-licensed spectrums, the Channel Occupancy Time (COT) of the communication device is generally limited, for example, is limited by the maximum value MCOT. Therefore, this transmission scheme is very useful for limited COT in non-licensed spectrums.

In an embodiment of the present disclosure, at least one of high-level signaling (for example Radio Resource Control (RRC) signaling) and physical layer signaling (for example Downlink Control Information (DCI), Uplink Control Information (UCI) in a NR system) can be used for signaling interactions (for example, for resource configuration, etc.) between a base station and a terminal.

Resource Allocation and Resource Access

Figure 2A:
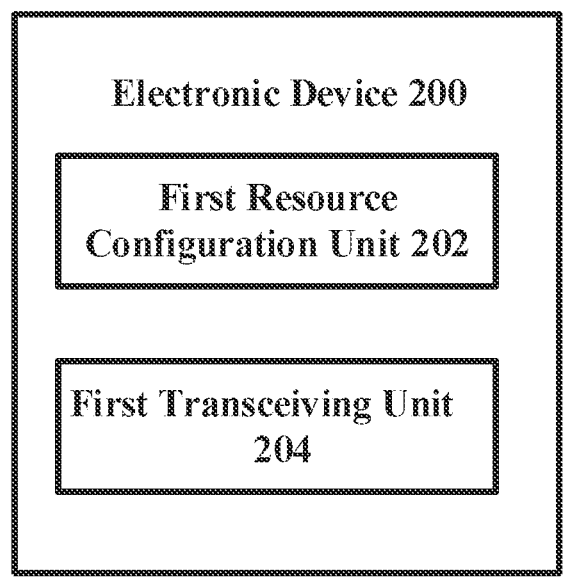
FIG. 2A shows an exemplary electronic device for a base station side according to an embodiment of the present disclosure.

FIG. 2A shows an exemplary electronic device for a base station side according to an embodiment of the present disclosure, where the base station can be used in various wireless communication systems. The electronic device 200 shown in FIG. 2A can include various units to implement various embodiments according to the present disclosure. In this example, the electronic device 200 can include a first resource configuration unit 202 and a first transceiving unit 204. In one implementation, the electronic device 200 can be implemented as the base station 120A (or a part thereof) in FIG. 1, or can be implemented as a device used to control the base station 120A or a device related to the base station 120A (for example a controller, or a part thereof). The various operations described below in conjunction with the base station can be implemented by the units 202 and 204 of the electronic device 200 or other possible units.

In some embodiments, the first resource configuration unit 202 can be configured to determine resource configuration information for uplink and downlink. The resource configuration information can be used for at least one of a licensed spectrum and a non-licensed spectrum. For example, the resource configuration information can indicate allocated resources in licensed or non-licensed spectrum for uplink transmission by a terminal; the resource configuration information can also indicate allocated resources in licensed or non-licensed spectrum for downlink transmission by a base station. In some embodiments, the resources may include one or more resources, and the resource configuration information may include one or more offsets indicating positions of the one or more resources. The offsets can indicate the offset situation of the resources in frequency domain and/or time domain. In an embodiment, a single resource may correspond to multiple offsets, and multiple resources may correspond to a same offset, and at least one resource of multiple resources may correspond to one or more offsets. Wherein, multiple offsets can be set to be the same or different according to resource configuration and other requirements.

In some embodiments, the resources correspond to one or more periods, wherein at least one period has a starting point and an ending point. In addition to the starting point and the ending point, the resource configuration information may also indicate one or more offsets relative to the starting point of the period, as described in detail below.

In some embodiments, the first transceiving unit 204 can be configured to transmit uplink resource configuration information to a terminal (for example, by at least one of RRC signaling and physical layer signaling). Once the resource configuration information for downlink is determined, it can be known by the base station.

Figure 2B:
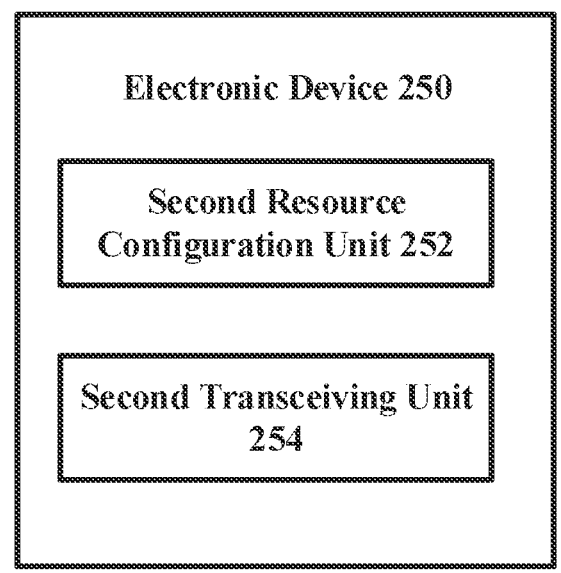
FIG. 2B shows an exemplary electronic device for a terminal side according to an embodiment of the present disclosure.

FIG. 2B shows an exemplary electronic device for a terminal side according to an embodiment of the present disclosure, where the terminal can be used in various wireless communication systems. The electronic device 250 shown in FIG. 2B can include various units to implement various embodiments according to the present disclosure. In this example, the electronic device 250 may include a second resource configuration unit 252 and a second transceiving unit 254. In one implementation, the electronic device 250 can be implemented as any one (or a part of) the terminal devices 110A to 110N in FIG. 1. The various operations described below in conjunction with the terminal can be implemented by the units 252 and 254 of the electronic device 250 or other possible units.

In some embodiments, the second transceiving unit 254 can be configured to receive uplink resource configuration information from a base station (for example, by at least one of RRC signaling and physical layer signaling). The resource configuration information can indicate allocated resources in licensed spectrum or non-licensed spectrum for uplink transmission by a terminal. The resources can correspond to one or more periods, wherein at least one period has a starting point and an ending point. In addition to the starting point and the ending point, the resource configuration information may also indicate one or more offsets relative to the starting point of the period. Accordingly, the second resource configuration unit 252 can be configured to determine the uplink resources to be used based on the resource configuration information.

The foregoing units are only logical modules divided according to the specific functions they implement, and are not used to limit specific implementations, for example, they can be implemented in software, hardware, or a combination of software and hardware. In actual implementation, each of the foregoing units can be implemented as an independent physical entity, or can also be implemented by a single entity (for example, a processor (CPU or DSP, etc.), an integrated circuit, etc.). Wherein, processing circuitries can refer to various implementations of a digital circuit system, an analog circuit system, or a mixed signal (combination of analog and digital) circuit systems that perform functions in a computing system. Processing circuitries may include, for example, circuits such as integrated circuits (ICs), application specific integrated circuits (ASICs), parts or circuits of individual processor cores, entire processor cores, individual processors, programmable hardware devices such as field programmable gate arrays (FPGAs), and/or systems including multiple processors.

In wireless communication systems, there are multiple feasible methods to configure time-frequency resources. According to whether the configured resource changes during a certain period of time, the resource configuration method may include, for example, known dynamic configuration, continuous configuration, and semi-continuous configuration. In an embodiment of the present disclosure, the resources may correspond to one or more periods, wherein at least one period has a starting point and an ending point. The starting point and the ending point define the time range within which the terminal and/or base station can use corresponding resource, in the case that the starting point and the ending point have been determined, the time range of the resource is determined. In some embodiments, adaptability can be given to the time range of the resource, thereby increasing the flexibility of resource configuration in time domain. In one embodiment, in addition to the starting point and the ending point of the period, one or more offsets relative to the starting point can also be configured. For example, the resource configuration information may indicate the one or more offsets by amounts of offset time relative to the starting point or a particular reference time. In this way, when the terminal and/or the base station try to access a channel, it can adaptively access the channel at the starting point or the offsets according to whether the channel is occupied.

Figure 3A:
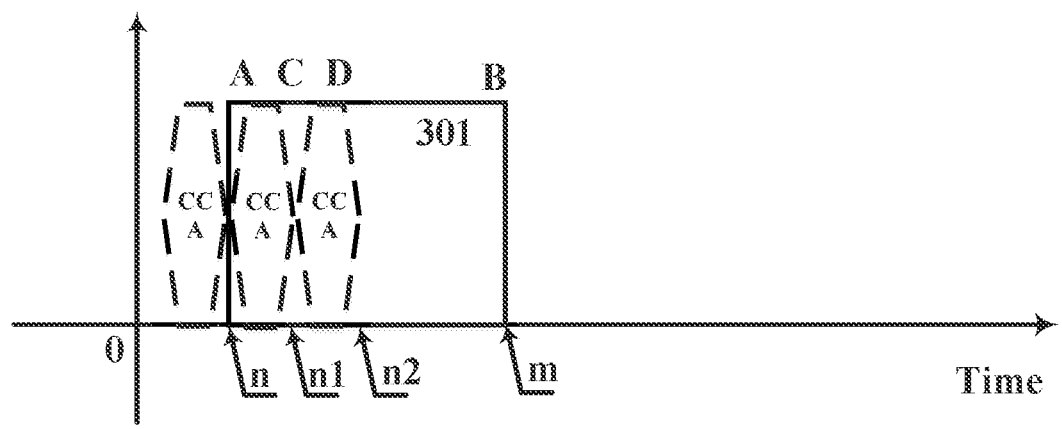
FIGS. 3A to 3D show exemplary resource configuration schemes according to embodiments of the present disclosure.

FIG. 3A shows an exemplary resource allocation scheme 300 according to an embodiment of the present disclosure. In an embodiment, the configuration scheme can be used in uplink and/or downlink; the configuration scheme can be used in licensed spectrum and/or non-licensed spectrum. In FIG. 3A and the following similar figures, only the configuration of time-frequency resources in the time domain is shown, and those skilled in the art can use any appropriate manner to perform frequency domain configuration. As shown in FIG. 3A, the window 301 can represent the allocated time domain resource 301, that is, the period 301 corresponding to the allocated time-frequency resource. The period 301 has a starting point A and an ending point B. Additionally, the period 301 also has two offsets C and D (the two offsets are only examples, and it is possible to have other number of offsets). In some implementations, the offset situations of a corresponding point relative to a reference time (for example, amounts of offset subframe, slot, symbols, etc.) can be used to represent the starting point, the ending point, and the offsets. In one embodiment, the duration of the period may also be used to implicitly indicate the ending point. If the terminal or base station expects to use the resource 301, it can be used as an initiating device to perform CCA before at least one of the starting point A and offsets C and D (as shown by the dashed line in FIG. 3A), so as to determine whether the operating channel can be accessed at the corresponding point. In an embodiment, Clear Channel Assessment (CCA) may correspond to Type 2 Listen Before Talk (LBT) (for example, one-shot LBT) or Type 4 LBT in the NR system.

Figure 3B:
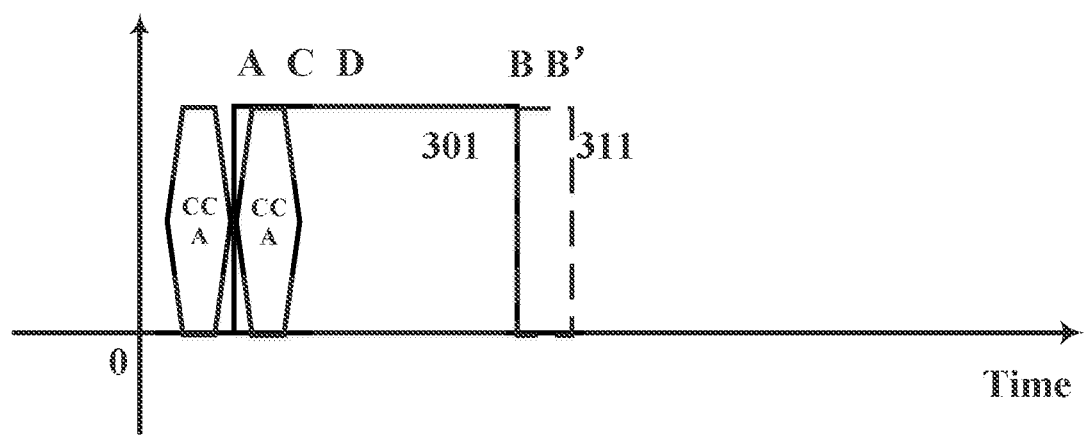

In FIG. 3A, compared to only having a starting point A, the existence of offsets C and D can make the initiating device to use of the configured resources more flexible and more effective. For example, in one embodiment, although the period 301 of the resource has been configured, the initiating device may not be ready for transmission at the starting point A (or offset C) or the CCA may be unsuccessful, and then the initiating device may still access the operating channel at offsets C and D (or offset D) and use the allocated resources during the remaining period of 301. FIG. 3B shows a usage example of the resource allocation scheme 300. In this example, the initiating device (terminal or base station) expects to access the operating channel at the starting point A and perform CCA before point A (as shown by the solid line). However, the CCA was unsuccessful, and the initiating device failed to access the operating channel at the starting point A. After that, the initiating device performs CCA again before the next offset C (as shown by the solid line). This CCA is successful, so the initiating device can access the operating channel at offset C (although it fails to access at starting point A). Compared with abandoning the use of the entire period 301 because of failing to access the operating channel at the starting point A, the resource allocation scheme 300 and corresponding usage method are more flexible and efficient. On the other hand, in some embodiments, the offsets may only be arranged at limited positions in the period 301. In this way, CCA can only be performed at limited positions (rather than continuously performed during the entire period 301), thereby saving power consumption of the initiating device.

In the example of FIG. 3B, the ending point B of the period 301 may be fixed or may be variable (for example, based on the time point of access to the operating channel). For example, because the CCA before the starting point A is unsuccessful causing the initiating device accesses the operating channel later than the starting point A, the ending point B can be postponed to B' to compensate for the "late access", for example, to compensate a period 311.

Figure 3C:
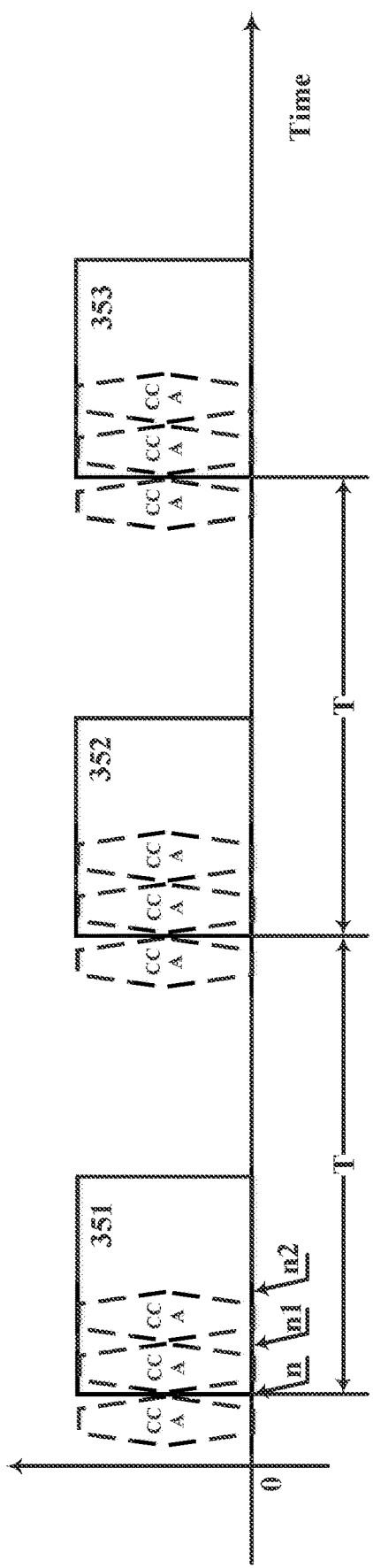

The resource allocation scheme 300 in FIG. 3A may correspond to a one-time static configuration, or may correspond to a part of a continuous or semi-continuous configuration (for example, a cycle). FIG. 3C shows an exemplary resource allocation scheme 350 according to an embodiment of the present disclosure. The resource allocation scheme 350 shows a specific example of continuous or semi-continuous configuration. In the example of FIG. 3C, multiple periods 351 to 353 of the resource have been configured. Each period 351 to 353 can be understood similarly to the period 301 in FIG. 3A. For example, each period has a starting point and an ending point and offsets. In addition, in FIG. 3C, a plurality of periods 351 to 353 can be configured to have a cycle T, for example.

Figure 3D:
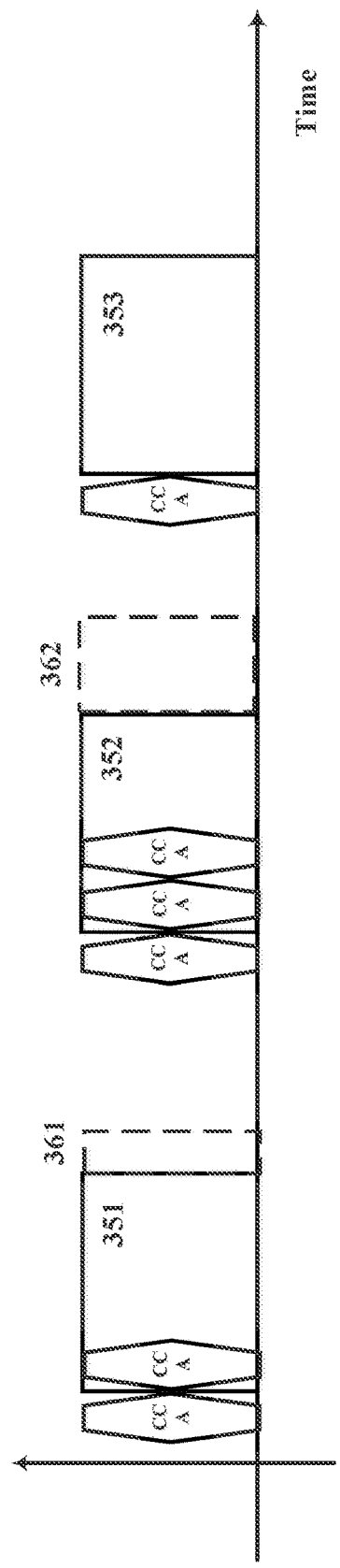

FIG. 3D shows a usage example of the resource allocation scheme 350. The channel access in each period in this example can be understood similarly to FIG. 3B. For example, for the period 351, the initiating device (terminal or base station) performs CCA twice and accesses the operating channel at the first offset. Optionally, the period 351 may be compensated for corresponding period 361 (for example, equal to the offset between the first offset and the starting point). For the period 362, the initiating device performs CCA three times and accesses the operating channel at the second offset. Optionally, the period 352 may be compensated for corresponding period 362 (for example, equal to the offset between the second offset and the starting point). For the period 353, the initiating device only performs CCA once and accesses the operating channel at the starting point. Similar to the resource allocation scheme 300, the resource allocation scheme 350 and the corresponding usage are also more flexible and efficient.

It should be understood that the number of offsets in a single period can be not limited, for example 2, 3, 4, etc. These offsets can be distributed during the entire period or only in the earlier part of the period. In one embodiment, these offsets are scattered so that the initiating device will not continuously monitor the channel during COT.

The manner of resource allocation according to an embodiment of the present disclosure can be represented in any appropriate manner. For example, each point related to the period can be represented in an absolute manner or a relative manner. According to one manner, the actual time domain position (for example, subframe, slot, symbol, etc.) of a corresponding point may be used to represent the starting point, the ending point, and the offsets, for example, n, m, n1, and n2 in FIG. 3A. According to another manner, the offset (for example, amounts of subframe, slot, symbol of the offset, etc.) of a corresponding point relative to a reference time (for example, SFN=0, the slot or symbol position when the terminal receives specific signaling (for example uplink scheduling information), etc.) can be used to represent the starting point, the ending point and the offsets. In some cases, the ending point and/or the offsets can also be represented by a time domain offset relative to the starting point.

The following table shows an example indicating manner of the resource configuration 300. As shown in the table, in Example 1, the starting point, the ending point, and the offsets are all expressed by the offsets (offset0 to offset3) relative to the reference time tr. In Example 2, the starting point is still represented by the offset (offset0) relative to the reference time tr, and the ending point and the offsets are represented by the offsets (offset11 to offset31) relative to the starting point, respectively. The difference between Example 3 and Example 2 is that, in Example 3, a unit offset delta is defined, and each offset is represented as offsetting an integer multiple of the delta relative to the starting point. The resource configuration 350 can be similarly represented. Each period 351 to 353 can be represented similarly to the period 301. In one embodiment, for multiple periods 351 to 353, only the number of offsets and the offsets situation may be limited by the offset information, and the offset information is applicable to all periods. In some cases, the offset information for different periods may also be different.

TABLE 1

|  | Example 1 | Example 2 | Example 3 |
| --- | --- | --- | --- |
| Starting Point A | n = tr + offset0 | n = tr + offset0 | n = tr + offset0 |
| Ending Point B | m = tr + offset1 | m = n + offset1 | m = n + offset10 |
| Offset C | n1 = tr + offset2 | n1 = n + offset20 | n1 = n + delta |
| Offset D | n2 = tr + offset3 | n2 = n + offset30 | n1 = n + 2 × delta |

In an embodiment of the present disclosure, in downlink, the base station itself knows the resource configuration; in uplink, the base station can use at least one of high-level signaling (for example RRC signaling) and physical layer signaling (for example NR DCI) to transfer the resource configuration information to the terminal. In some embodiments, all information related to the period in the resource configuration, including the starting point, the ending point, and the offsets, may be transferred only by high-level signaling. At this time, when initial configuration and reconfiguration (for example reconfiguration of any one of the starting point, the ending point, or the offsets) are required, high-level signaling needs to be transferred. In one embodiment, the offsets can also be activated by physical layer signaling. That is, when offsets of the period are configured by high-level signaling, the offsets will not be automatically activated. The offsets are activated only when activated by physical layer signaling. In other embodiments, the starting point and the ending point related to the period in the resource configuration may be transferred by high-layer signaling, and the offsets related to the period may be transferred by physical layer signaling. Since the physical layer signaling can be transferred quickly, transferring the offsets information by it, the offsets of the period can be configured and updated more flexibly. At this time, the high-level signaling can be responsible for the initial configuration and reconfiguration of the starting point and ending point of the period; the physical layer signaling can be responsible for the initial configuration and reconfiguration of the offsets of the period. In some other embodiments, the starting point, the ending point, and offsets information of the period may be transferred only by physical layer signaling. In some cases, while following the signaling usage manner in the foregoing embodiment, basic parameters such as the use cycle and transmission power of the resource can still be configured by high-level signaling.

Various types of communication devices complying with different wireless communication standards each can use non-licensed spectrum for communication. For example, these communication devices may include eNB, gNB, UE in LTE or NR system, and AP and MS in WLAN system, and the like. In terms of using channels in non-licensed spectrum, there will be competition among communication devices in different systems. In some cases, the base station and the terminal can access non-licensed channel (hereinafter also referred to as operating channel) in a similar manner as in licensed spectrum based on their own communication requirements. In some cases, in order to enable most communication devices in non-licensed spectrum to use non-licensed channel in a fair manner, the base station and the terminal can monitor operating channel before accessing the channel (for example, through the LBT manner), and access the operating channel only if ascertain the channel may be free.

In the LBT manner, the device that first transmits a message to the other party can be referred to the initiating device, and the corresponding party can be referred to the responding device. For example, if the base station transmits a downlink message first, the base station is the initiating device and the corresponding terminal is the responding device; the opposite situation can be similarly understood. For the case where a base station/terminal is used as the initiating device or the responding device, the LBT process described in the present disclosure can be applied.

FIGS. 4A and 4B show an exemplary LBT process according to embodiments of the present disclosure. In FIG. 4A, there is a fixed frame cycle, and the fixed frame cycle includes Channel Occupancy Time (COT) and idle period. As is known, this type of LBT may be referred to as Frame-Based Equipment (FBE) LBT. If a terminal or base station expects to use the operating channel during COT, it can act as an initiating device to perform the LBT process. For example, the initiating device can monitor the operating channel during the previous idle period adjacent to the COT (as indicated by the solid line CCA in FIG. 4A), and when it is determined that the operating channel is not occupied, use the operating channel during the COT period. One example of determining whether a channel is occupied may be referred to as Channel Clear Assessment (CCA), which may be based on the signal energy or power situation monitored on the operating channel. For example, in the case that the monitored signal energy or power is lower than a certain threshold, it can be considered that the operating channel is not occupied (or said to be idle, at this time the CCA is successful). In some embodiments, if the CCA before the COT is unsuccessful, the initiating device may continue the CCA later at one or more offsets relative to the COT (as indicated by the dashed line CCA in FIG. 4A).

In FIG. 4A, channel monitoring is performed during idle period. If a CCA indicates that the channel is idle before the COT, the initiating device can use the operating channel during the COT until the COT ends. After the COT ends, the device will stop using the operating channel. At this time, if the device still expects to use the operating channel, it must perform CCA again in idle time. In some embodiments, the foregoing monitoring process may be performed through one-shot LBT. One simple one-shot LBT corresponds to a time of 25 microseconds. Specifically, 16 microseconds plus one or more periods of 9 microseconds constitute a so-called one-shot. In some cases, a more complicated LBT process can be performed, for example, type 4 LBT (containing contention window and random backoff counter) in NR system.

In FIG. 4B, there is no fixed frame period, but COTs and idle periods still appear alternately in time domain. As is known, this type of LBT may be referred to as a Load-Based Equipment (LBE) LBT. In LBE LBT, COT is driven by the communication load of an initiating device, and the transmission demand of the initiating device causes the appearance of COT. Moreover, the duration of COT depends on the transmission volume, as long as the COT does not exceed the maximum allowable MCOT. If the transmission demand still exists after MCOT, the next COT can be driven after idle period. Different from FIG. 4A, in LBE LBT, because the appearance of COT is not fixed in time domain, the initiating device can monitor the operating channel for CCA as long as transmission is needed, and use the operating channel when the CCA is successful, until the end of the transmission or MCOT is reached. In the example of FIG. 4B, the channel monitoring method in FIG. 4A can also be used, which will not be repeated here.

During COT, the premise that an initiating device can use an operating channel is that corresponding resources have been allocated for the initiating device. Under this premise, as long as the possibility of channel occupation (maybe due to some reason, for example occupation from other communication systems) can be ruled out before the arrival of COT, the initiating device can use the allocated resources. In some embodiments, if the CCA before COT is unsuccessful, the initiating device is allowed to continue the CCA during a part or the entire COT and use the operating channel during the remaining COT if the CCA is successful. In some cases, COT can be expanded accordingly or appropriately according to the time occupied by CCA. In some embodiments, the initiating device may also share the COT with the responding device. Specifically, when the initiating device temporarily ends transmission, the remaining COT can be shared with the responding device. When the responding device ends transmission, the initiating device can also resume using the operating channel. The sharing process can be deduced like this.

In some embodiments, for downlink FBE frame structure (that is, a base station acts as an initiating device), the base station can be configured to transmit some fixed signaling or signals during COT. In this way, on one hand, the fixed signaling or signal can be matched with the fixed COT; on the other hand, in downlink, there are fewer devices that simultaneously access the operating channel with the base station, and the CCA of the base station is easier to succeed (ensure to be able to transmit these signaling or signals). Therefore, in one embodiment, for downlink FBE frame structure, the base station can be configured to transmit synchronization signals (for example, SS/PBCH in NR systems) and/or reference signals (for example, discovery reference signal DRS in NR systems) during COT. Accordingly, the terminal can be configured to receive synchronization signals and/or reference signals during COT. At this time, in the case that the base station and the terminal share the COT, the terminal can access the operating channel for transmission during the shared COT period. In one embodiment, the terminal may only send a small amount of data during the shared COT, for example, send a measurement report to the base station. Accordingly, the base station can be configured to receive transmissions from the terminal, such as measurement reports, during sharing COT with the terminal.

Figure 5:
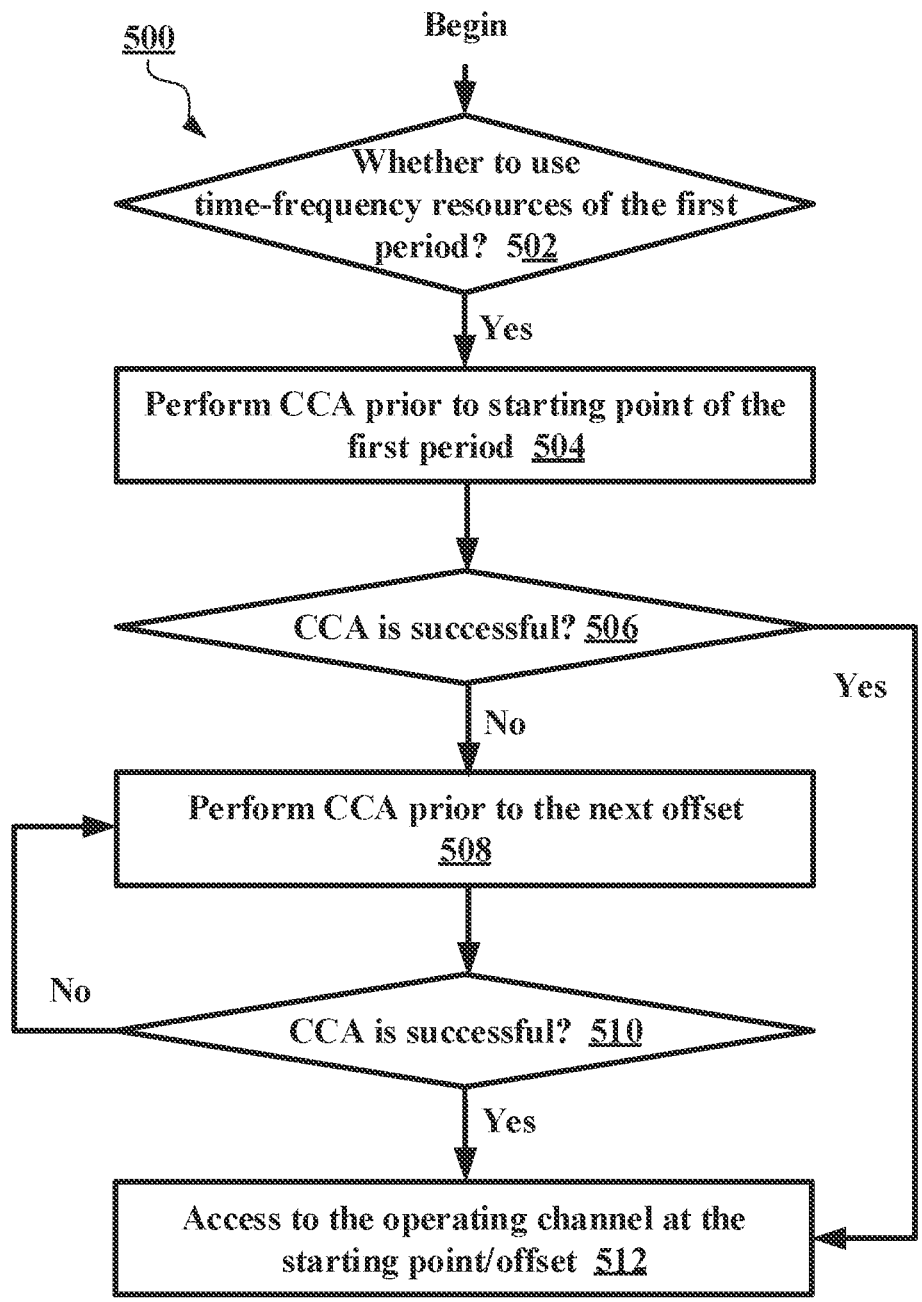
FIG. 5 shows an exemplary operation flow for initiating a device to access an operating channel according to an embodiment of the present disclosure.

FIG. 5 shows an exemplary operation flow 500 for an initiating device to access an operating channel according to an embodiment of the present disclosure. In an embodiment, a terminal may use the operation flow in uplink, or a base station may use the operation flow in downlink. In the operation flow 500, for at least one period in a resource configuration, CCA is performed prior to a starting point of the period. If CCA is successful, start to use resources at the starting point; otherwise, perform the CCA prior to each subsequent offset until the CCA is successful at a certain offset or all offsets are past. As shown in FIG. 5, after the flow 500 starts, it is determined at 502 whether to use resources of the first period (for example, 301) based on the resource configuration (for example, the configuration 300). If the determination is yes, proceed to 504; otherwise, the flow ends. At 504, one or more CCA is performed prior to the starting point of the first period to monitor whether corresponding channel is occupied. At 506, it can be determined whether the CCA is successful according to certain criteria. If CCA is successful, proceed to 512 to access the operating channel at the starting point; otherwise proceed to 508. At 508, one or more CCA can be performed before the next offset to monitor whether corresponding channel is occupied. At 510, a criterion can also be used to determine whether the CCA is successful. If successful, proceed to 512 to access the operating channel at the offset; otherwise, return to 508 and repeat the operations of 508 and 510 until the CCA is successful at a certain offset and accesses the operating channel at the offset, or until all offsets are past and CCA is unsuccessful, so that the resources of the first period are not used.

Figure 6:
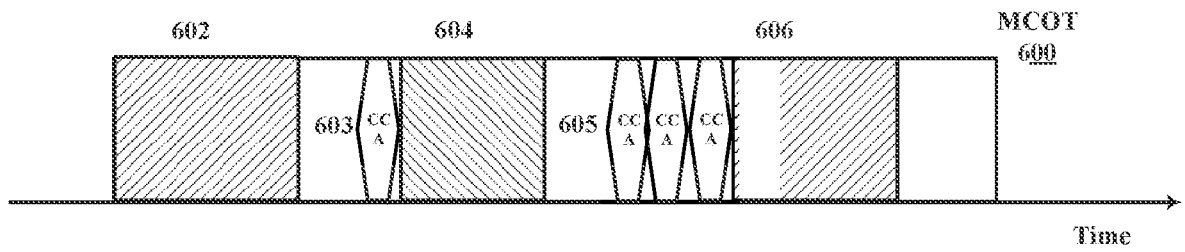
FIG. 6 shows a schematic diagram of an example of sharing COT according to an embodiment of the present disclosure.

In the embodiments of the present disclosure, the initiating device can share the COT obtained by itself with the responding device, so that the resources during the COT period can be used by the responding device when it does not need to transmit temporarily, that is, the resource utilization efficiency is improved. FIG. 6 shows a schematic diagram of an example of sharing COT according to an embodiment of the present disclosure. In FIG. 6, the initiating device can obtain the MCOT 600 through CCA, and start the first transmission 602 to the responding device at the starting point of the MCOT. Since MCOT still has some left after the first transmission 602, the initiating device can transmit operating channel authorization information to the responding device within the first transmission 602 (for example, at the end of the first transmission 602) to allow the responding device to share MCOT (i.e., share corresponding resources during the remaining period of MCOT). Then, the responding device can perform a second transmission 604 to the initiating device. After sharing the MCOT with the responding device, the initiating device may still use corresponding resources of the MCOT again. For example, if MCOT still has some left after the second transmission 604, the initiating device may perform a third transmission 606 to the responding device. Moreover, if MCOT still has some left after the third transmission 606, the initiating device can still share the MCOT with the responding device as that in 602. In FIG. 6, each change of the transmission direction (initiating device to responding device or responding device to initiating device) can also be referred to as a transmission direction transition. There are often gaps between transmissions before and after the conversion, as shown in 603 and 605. Next, a specific operation example during the transition (or gap) will be described.

In some embodiments, after receiving the operating channel authorization information, if the responding device can transmit in a first period after the transmission from the initiating device ends, then it can directly use the operating channel for transmission to the initiating device at any time within the first period; otherwise, if the responding device wants to transmit after the first period after the transmission from the initiating device ends, it has to perform CCA for the operating channel after the first time period, and only after CCA is successful, the operating channel can be used for transmission to the initiating device. In the example of FIG. 6, the responding device performs the second transmission 604 only after undergoing one CCA in the gap 603, and completes the transmission direction transition. Generally, less (for example one) CCA may be undergone in the transmission direction transition, if the amount of data to be transmitted after transition is small (for example, control information).

In some embodiments, when the MCOT is shared with the responding device and the responding device has finished transmission, if the initiating device can transmit in a first period after the transmission from the responding device ends, it can directly use the operating channel for transmission to the responding device at any time within the first period; otherwise, if the initiating device wants to transmit only after the first period after the transmission from the responding device ends, it has to perform CCA for the operating channel after the first time period, and only after CCA is successful, the operating channel can be used for transmission to the responding device. In the example of FIG. 6, the initiating device performs the third transmission 606 only after undergoing three CCA in the gap 605, and completes the transmission direction transition. Generally, more (for example, more than 2) CCA may be undergone in the transmission direction transition, if the amount of data to be transmitted after transition is large (for example, data traffic).

In the above embodiments, the transition after the first period requires to perform CCA mainly for fairness considerations. That is, if transition gap is too long, the transmission after transition will be regarded as a newly generated occupation of the channel, so CCA is required. In one embodiment, the length of the first period described above may be 16 microseconds, and each CCA may be 9 microseconds. For example, CCA for operating channels can correspond to one-shot Listen Before Talk (LBT). In one embodiment, there will be multiple CCAs after the first period, or there can be multiple one-shot LBTs so as to completely fill the gaps in the transmission transition. The number of one-shot LBTs can be related to the gap length and the capabilities of the initiating device or responding device.

Figure 7A:
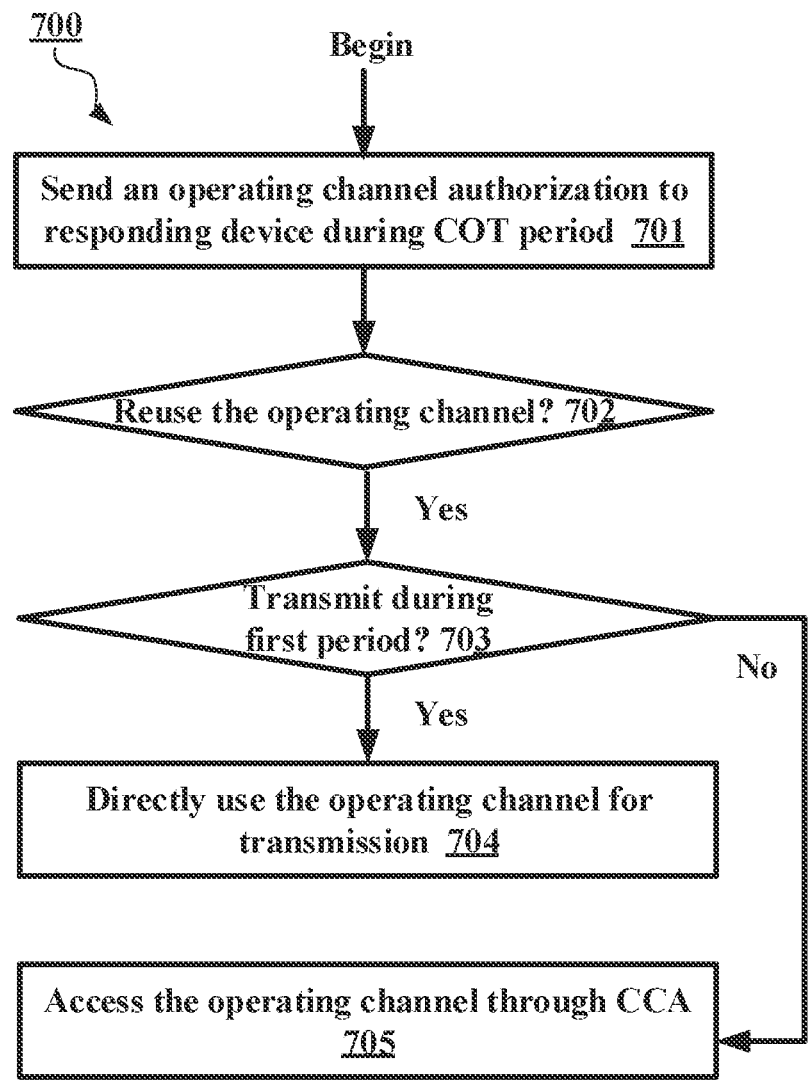
FIG. 7A shows an exemplary operation of an initiating device in the case of sharing COT according to an embodiment of the present disclosure.

FIG. 7A shows an exemplary operation of the initiating device in the case of sharing COT according to an embodiment of the present disclosure. In an embodiment, the initiating device may be a base station in downlink or a terminal in uplink. After operation 700 starts, at 701, the initiating device sends an operating channel authorization to the responding device during the COT period it has obtained. As described above, the transmission direction can be transitioned, and the responding device can then access to the operating channel for transmission based on the operating channel authorization. After transmission of the responding device ends, at 702, the initiating device may determine whether to reuse the operating channel (for example, based on whether there is data to be sent). In the case of reuse, at 703, the initiating device may determine whether transmission will be conducted in the first period (for example, 16 microseconds). If yes, proceed to 704. At 704, the initiating device can directly use the operating channel for transmission. Otherwise proceed to 705. At 705, the initiating device can access the operating channel through CCA.

Figure 7B:
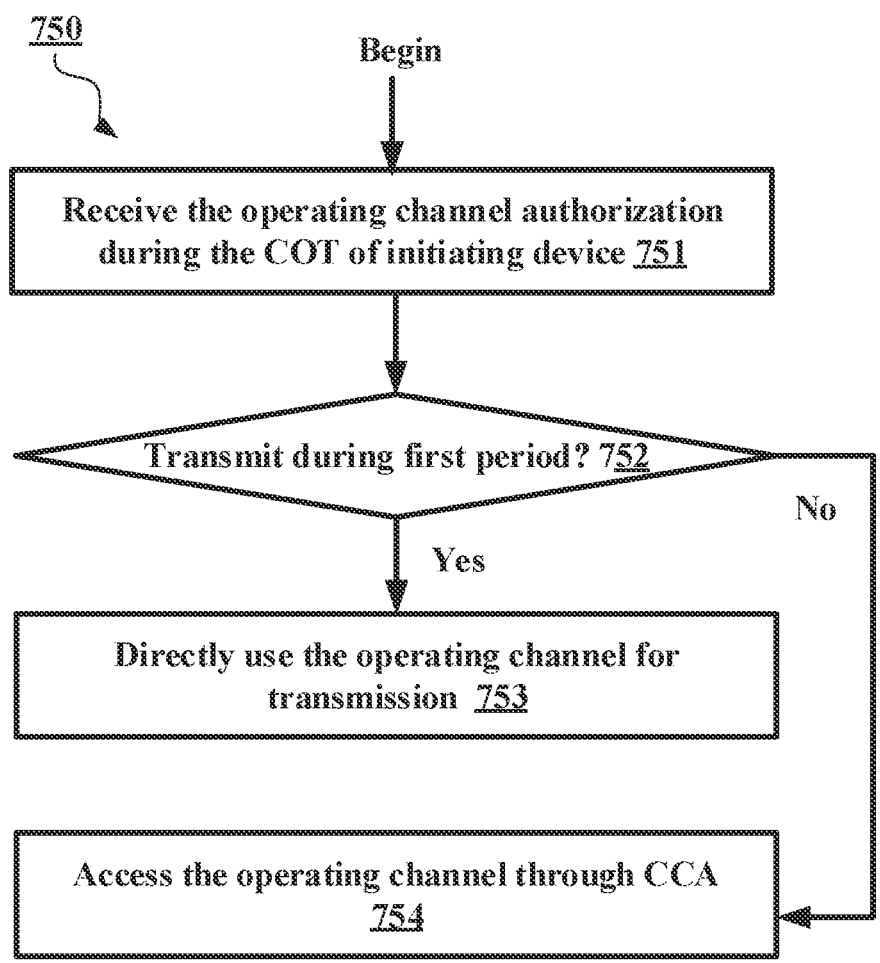
FIG. 7B shows an exemplary operation of a responding device in the case of sharing COT according to an embodiment of the present disclosure.

FIG. 7B shows an exemplary operation of a responding device in the case of sharing COT according to an embodiment of the present disclosure. In an embodiment, the responding device may be a terminal in downlink or a base station in uplink. After operation 750 starts, at 751, during the COT of the initiating device, the responding device may receive the operating channel authorization from the responding device. In the case that the operating channel needs to be used, the responding device may determine at 752 whether transmission will be conducted in a first period (for example, 16 microseconds). If yes, proceed to 753. At 753, the initiating device can directly use the operating channel for transmission. Otherwise proceed to 754. At 754, the initiating device can access the operating channel through CCA.

Transport Block Transmission Scheme—Repetitive Transmission

Figure 8A:
FIGS. 8A to 8C show examples in which a sender determines and performs repetitive transmissions according to embodiments of the present disclosure.

In an embodiment of the present disclosure, in order to improve transmission efficiency of transport blocks, a sender (for example, a base station in downlink, a terminal in uplink) may repetitively transmit a single transport block. Specifically, the sender may determine by itself a number K of repetitive transmissions of a single transport block, and notify a receiver of the number K of repetitive transmissions. Then, the sender transmits K times for a single transport block. As shown in FIG. 8A, the sender determines and repetitively transmits 4 times a single transport block, that is, a total of 4 transmissions from 802 to 808 (wherein the dotted lines indicate additional transmissions due to repetition), which can be close or closely adjacent in time domain. The receiver can performs combining processing on K receptions of a single transport block to decode the transport block, thereby improving decoding success rate. The K transmissions of the transport block may be exactly the same, or may have different Redundancy Version (RV). In the latter case, the sender will also notify the receiver of RV parameter information (the parameter information may be the sequence/pattern/rule of the repetition RV for the repetitive transmissions of a single transport block), so that the receiver can perform combining processing (for example, soft combining).

In some cases, the resources configured for the sender may be limited in time domain. For example, in licensed spectrum or non-licensed spectrum, due to large number of users, the time domain resources configured for at least some senders may be limited. For another example, in non-licensed spectrum, since base stations and terminals share the frequency band with other devices in non-licensed spectrums such as WLAN, the sender can obtain a limited Channel Occupancy Time (COT), for example, limited to a maximum value MCOT. In such cases, the repetitive transmissions of a single transport block according to an embodiment can complete transmissions of the transport block on limited time domain resources because it is possible to complete in a short time (and the receiver is easier to receive the transport block correctly).

In some embodiments, the number K of repetitive transmissions may be determined based on at least one or more of the following, that is, the Channel Occupancy Time (COT) of a sender, the charge level of a sender, or the link channel status from a sender to a receiver. For example, when there is a COT restriction, the sender can enable repetitive transmissions; and/or, when the charge level of the sender is sufficient, the sender can enable repetitive transmissions; and/or, when the above-mentioned link channel is not ideal, the sender can enable repetitive transmissions.

Figure 8B:
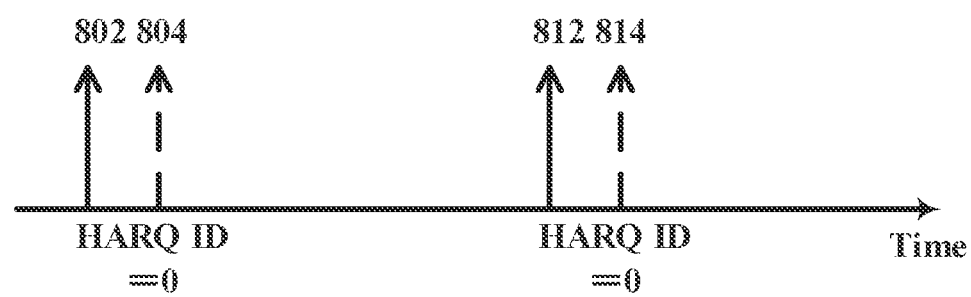

FIG. 8A shows an example in which a sender determines and repetitively transmits a single transport block according to an embodiment of the present disclosure. In the case of using the HARQ mechanism, these four transmissions 802 to 808 may correspond to multiple repetitive transmissions of a single HARQ transmission of a single transport block. Wherein, a single HARQ transmission may be the first HARQ transmission or subsequent retransmission of the single transport block. FIG. 8B shows an example in which a sender determines and repetitively transmits a single process of HARQ transmission according to an embodiment of the present disclosure. In this example, the number K of repetitive transmissions is 2. As shown in FIG. 8B, for a single transport block, the initial transmission of the transport block is first transmitted in the HARQ process with HARQ process number (or called HARQ ID)=0. Further, since the number K of repetitive transmission is determined to be 2, the foregoing initial transmission can be repetitively transmitted twice (the dotted line 804 represents additional transmission due to repetition). Here, the HARQ IDs for transmitting 802 and 804 are both 0, and they can be understood as multiple instances of the HARQ process with ID 0. The receiver can receive the value of the number K of repetitive transmissions by the sender and the HARQ ID value corresponding to each reception through signaling. The receiver can decode the reception based on the K value and the HARQ ID value. Specifically, in FIG. 8B, it may be that the sender initiates HARQ retransmission due to the receiver fails to decode. HARQ retransmission and initial transmission have the same process ID, which are both 0 in FIG. 8B; HARQ retransmission and initial transmission can be distinguished by the flag bit (for example, through the new data indicator in LTE and NR systems)). In the HARQ retransmission of the transport block, the HARQ retransmission can be repetitively transmitted twice (the dashed line 814 represents additional transmissions due to repetition). Similarly, the HARQ IDs for transmitting 812 and 814 are both 0. Then, the receiver can similarly decode the reception based on the K value and the HARQ ID value. HARQ retransmission can be performed multiple times within the limitation of the maximum number of retransmissions until the original transport block is decoded or the maximum number of retransmissions is reached.

Figure 8C:
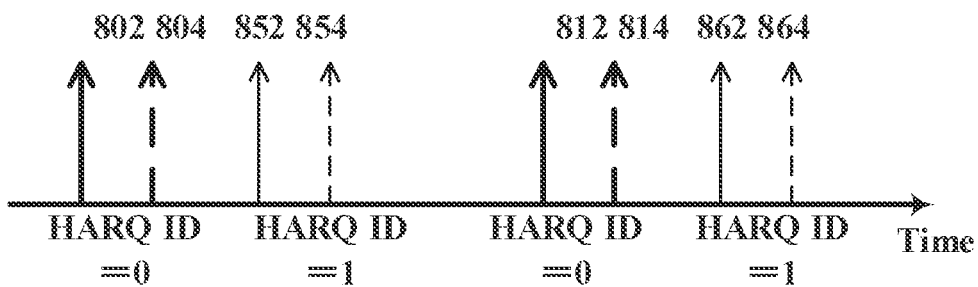

FIG. 8C shows an example in which a sender determines and repetitively transmits multiple processes for HARQ transmissions according to an embodiment of the present disclosure. In this example, the number K of repetitive transmissions is 2. The example of FIG. 8C can be understood similarly to that of FIG. 8B, and will only be briefly described here. In FIG. 8C, there are two concurrent HARQ processes (HARQ IDs are 0 and 1 respectively), and a sender can use these two processes to transmit, for example, a first transport block and a second transport block. A receiver can also decode the first transport block and the second transport block based on the K value and the HARQ ID value. In the case of decoding failure, HARQ retransmission can be performed separately for different transport blocks.

Figure 9A:
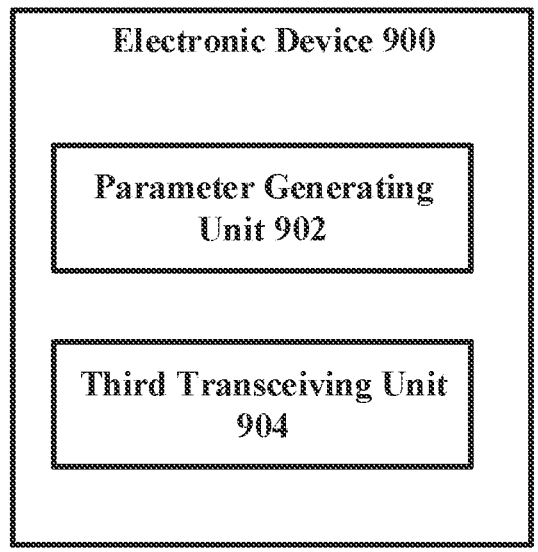
FIG. 9A shows an exemplary electronic device for a sender according to an embodiment of the present disclosure.

FIG. 9A shows an exemplary electronic device for a sender according to an embodiment of the present disclosure, where the sender can be implemented as a terminal (or base station) in various wireless communication systems. The electronic device 900 shown in FIG. 9A may include various units to implement various embodiments according to the present disclosure. In this example, the electronic device 900 may include a parameter generating unit 902 and a third transceiving unit 904.

In some embodiments, the parameter generation unit 902 can be configured to generate a parameter K for the number of repetitive transmissions of the same transport block to be transmitted by a sender. The third transceiving unit 904 can be configured to transmit the parameter K to a receiver, and to repetitively transmit at least one transport block by K times.

In a case that the sender is implemented as a terminal, the parameter generation unit 902 can be configured to generate a parameter K for the number of repetitive transmissions of the same transport block in uplink. The third transceiving unit 904 can be configured to transmit the parameter K to a base station, and repetitively transmit at least one transport block by K times.

Figure 9B:
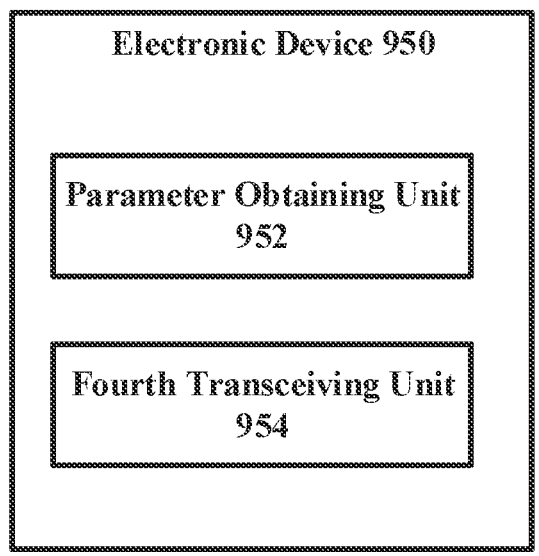
FIG. 9B shows an exemplary electronic device for a receiver according to an embodiment of the present disclosure.

FIG. 9B shows an exemplary electronic device for a receiver according to an embodiment of the present disclosure, where the receiver can be implemented as a base station (or terminal) in various wireless communication systems. The electronic device 950 shown in FIG. 9B may include various units to implement various embodiments according to the present disclosure. In this example, the electronic device 950 may include a parameter obtaining unit 952 and a fourth transceiving unit 954.

In some embodiments, the parameter obtaining unit 952 can be configured to receive and obtain the parameter K for the number of repetitive transmissions of the same transport block sent by a sender from the sender. The fourth transceiving unit 954 can be configured to receive K repetitive transmissions of at least one transport block from a receiver.

In a case that the receiver is implemented as a base station, the parameter obtaining unit 952 can be configured to receive and obtain the parameter K for the number of repetitive transmissions of the same transport block in uplink from the terminal. The fourth transceiving unit 954 can be configured to receive K repetitive transmissions of at least one transport block from the terminal.

The foregoing units are only logical modules divided according to the specific functions they implement, and are not used to limit specific implementations, for example, they can be implemented in software, hardware, or a combination of software and hardware. In actual implementation, each of the foregoing units can be implemented as an independent physical entity, or can also be implemented by a single entity (for example, a processor (CPU or DSP, etc.), an integrated circuit, etc.). Wherein, the processing circuitries can refer to various implementations of a digital circuit system, an analog circuit system, or a mixed signal (combination of analog and digital) circuit systems that perform functions in a computing system. Processing circuitries may include, for example, circuits such as integrated circuits (ICs), application specific integrated circuits (ASICs), parts or circuits of individual processor cores, entire processor cores, individual processors, programmable hardware devices such as field programmable gate arrays (FPGAs), and/or systems including multiple processors.

Figure 10A:
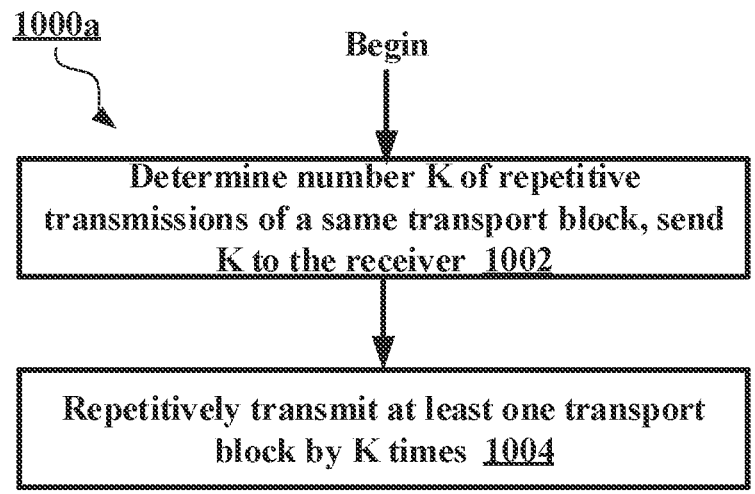
FIG. 10A shows a first example method for repetitive transmissions by a sender according to an embodiment of the present disclosure.

FIG. 10A shows a first example method 1000a for repetitive transmission by a sender according to an embodiment of the present disclosure. In uplink, the method can be performed by a terminal; in downlink, the method can be performed by a base station. After the method 1000a starts, the number K of repetitive transmissions of the same transport block in the link from a sender to a receiver can be determined at 1002, and the value of K can be sent to the receiver. At 1004, the sender can repetitively transmit at least one transport block by K times.

Figure 10B:
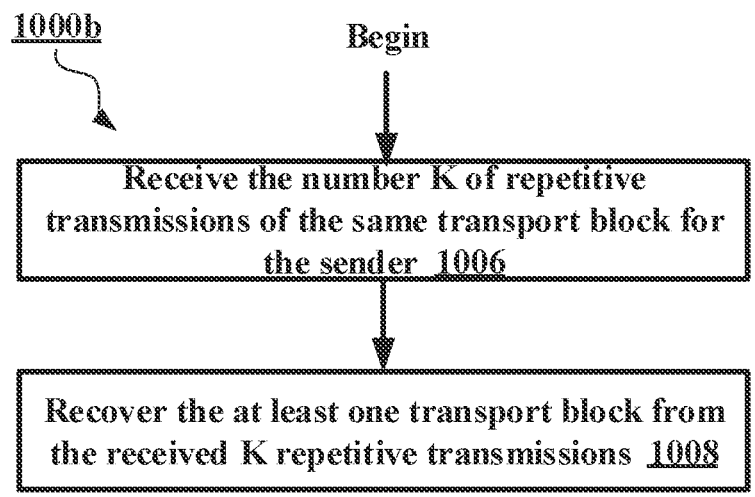
FIG. 10B shows a first example method for a receiver to receive repetitive transmissions according to an embodiment of the present disclosure.

FIG. 10B shows a first example method 1000b for a receiver to receive repetitive transmissions according to an embodiment of the present disclosure. In uplink, the method can be performed by a base station; in downlink, the method can be performed by a terminal. After the method 1000b starts, a receiver can receive the number K of repetitive transmissions of the same transport block for the sender at 1006. At 1008, the receiver may receive K repetitive transmissions of at least one transport block from the sender, and recover the at least one transport block from the received K repetitive transmissions.

Figure 10C:
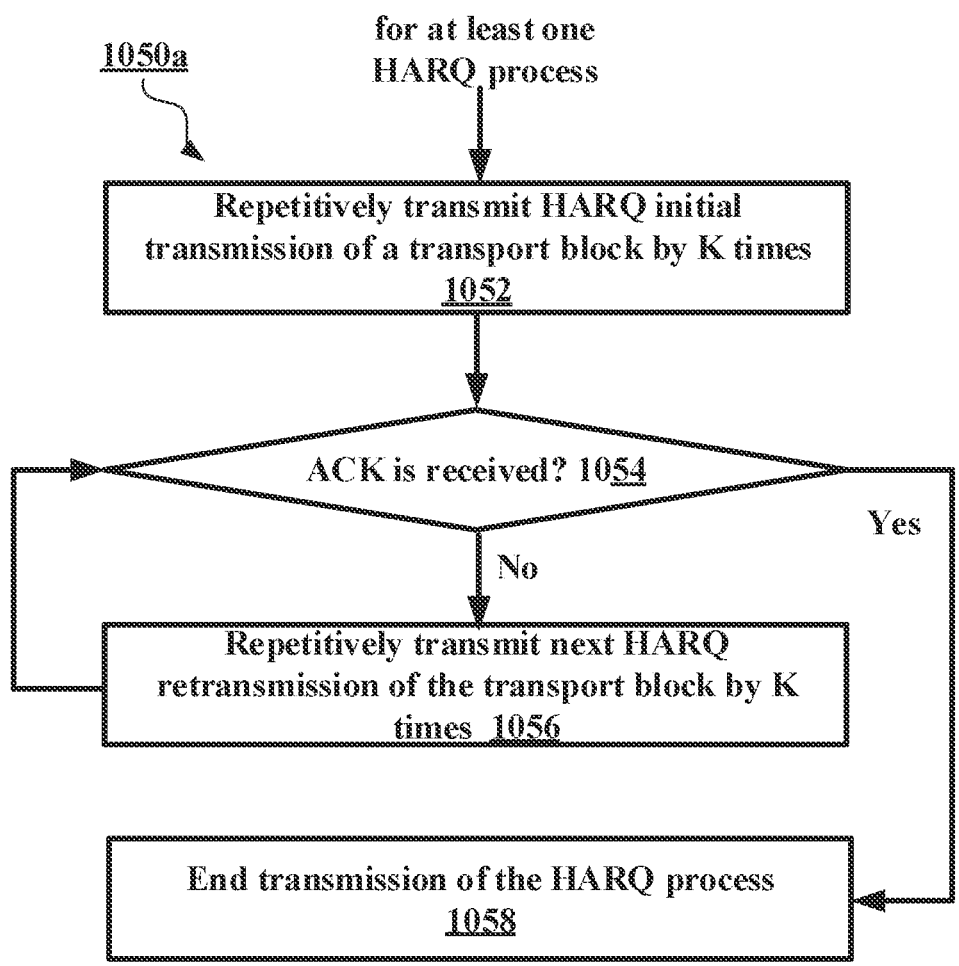
FIG. 10C shows a second example method for repetitive transmissions by a sender according to an embodiment of the present disclosure.

FIG. 10C shows a second example method 1050a for repetitive transmissions by a sender according to an embodiment of the present disclosure. In uplink, the method can be performed by a terminal; in downlink, the method can be performed by a base station. For at least one HARQ process, the sender can use the HARQ process to repetitively transmit a single transport block. As shown in FIG. 10C, the sender may repetitively transmit the HARQ initial transmission of the transport block by K times at 1052 (for example, as multiple instances of the same HARQ process), and determine at 1054 whether an ACK is received. If it is determined to be YES at 1054, it indicates that the transport block has been correctly recovered by the receiver, so it can proceed to 1058. At 1058, the sender may end the transmission of the HARQ process. If the determination is NO at 1054, it indicates that the transport block has not been correctly recovered by the receiver, so it is necessary to proceed to 1056 to repetitively transmit the next HARQ retransmission of the transport block by K times. After that, it can return to 1054 to determine again whether an ACK is received. If it is determined to be YES at this time, proceed to 1058 as well; otherwise, repeat the operation of 1056.

Figure 10D:
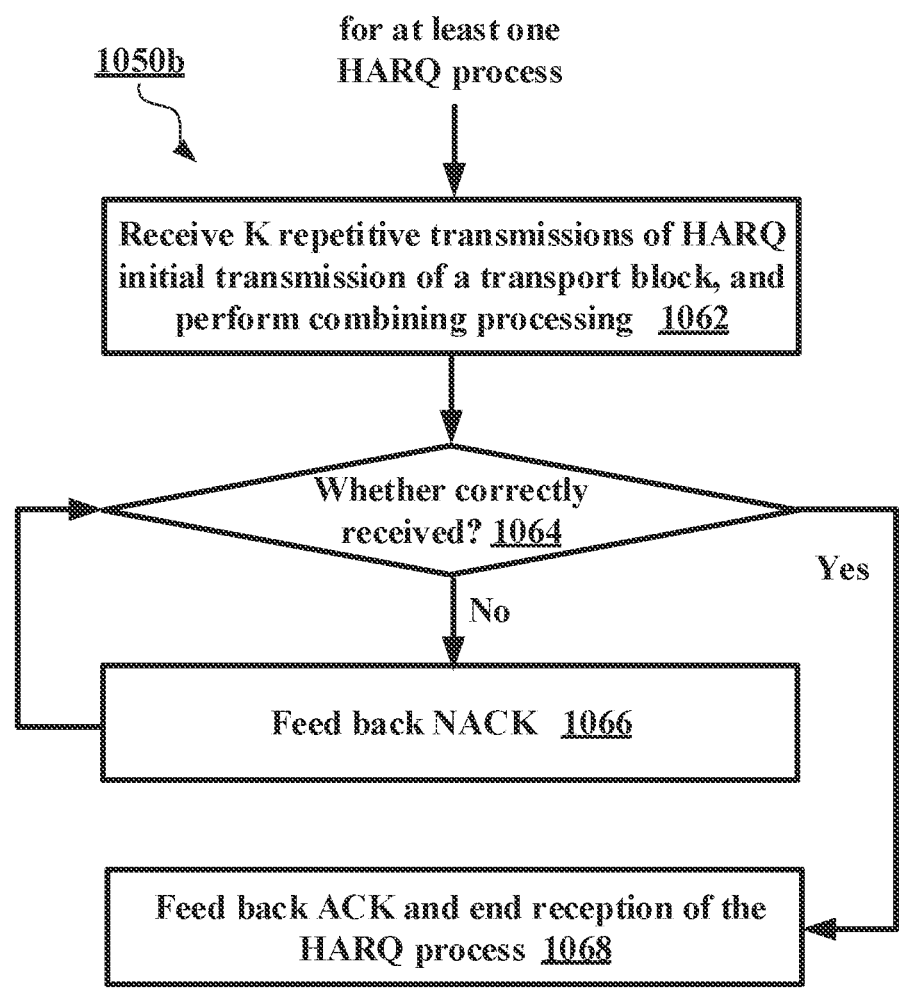
FIG. 10D shows a second example method for a receiver to receive repetitive transmissions according to an embodiment of the present disclosure.

FIG. 10D shows a second example method 1050b for a receiver to receive repetitive transmissions according to an embodiment of the present disclosure. In uplink, the method can be performed by a base station; in downlink, the method can be performed by a terminal. In the example of FIG. 10D, the receiver may receive multiple repetitive transmissions of HARQ initial transmission and/or retransmission of a single transport block. As shown in FIG. 10D, for at least one HARQ process, at 1062, the receiver can receive K repetitive transmissions of the HARQ initial transmission of the transport block, and performs combining processing on the multiple receptions. At 1064, the receiver can determine whether the transport block was recovered correctly. If it is determined to be YES at 1064, proceed to 1068. At 1068, the receiver can feed back ACK and end the reception of the HARQ process. If the determination at 1064 is NO, it needs to proceed to 1066. At 1066, the receiver can feed back NACK; next, the receiver receives K repetitive transmissions of the HARQ retransmission of the transport block, and performs combining processing. After that, it can return to 1064 to determine again whether the transport block is recovered correctly. If it is determined to be YES at this time, proceed to 1068; otherwise, repeat the operation of 1066.

In some embodiments, in licensed spectrum or non-licensed spectrum, the HARQ ID in uplink may not be related to a specific resource. In this way, the HARQ process may no longer be bound to a specific time domain position, for example, so that time domain positions may be flexibly configured or selected for HARQ processes and possible multiple instances (for example, for above repetitive transmissions).

Table 2 to Table 4 show uplink signaling related to repetitive transmissions of a terminal in uplink. As shown in Table 2, a "Repetition K" field indicating the number of repetitive transmissions and a "Repetition RV" field indicating the redundancy of different repetitive transmissions can be added to the physical layer signaling (for example NR UCI). As shown in Table 2, 2 bits can be used to represent the number of repetitive transmissions, and Table 3 shows example values. As shown in Table 2, 2 bits can be used to represent the repetition RV parameters for repetitive transmissions of the same transport block (for example, initial transmissions or retransmissions of a transport block), and Table 4 shows an example RV sequence. In addition to indicating the number of repetitive transmissions and the repetition RV parameter in the NR UCI, those skilled in the art can also similarly use other high-level signaling and physical layer signaling to convey information related to repetitive transmissions to the base station.

In some cases, a base station may also configure the number of repetitive transmissions for uplink. In some embodiments, since a terminal needs to determine the number of repetitive transmissions for uplink autonomously, the number of terminal determinations can always override the number of base station configurations, or the base station no longer configures the number of times or configures the number of times to a default invalid value after knowing the autonomous configuration of the terminal (that is, it is not adopted by the terminal).

In some cases, a base station may also configure the repetition RV parameter for repetitive transmissions of the same transport block (for example, initial transmissions or retransmissions of the transport block) in uplink. In these cases, a terminal may perform repetitive transmissions based on the repetition RV parameters configured by a base station. In some embodiments, since a terminal can generate the foregoing repetition RV parameter autonomously, the repetition RV parameter generated by the terminal can override the repetition RV parameter configured by a base station.

TABLE 2

Example of signaling format related to repetitive transmissions

| Fields | Bit width | |
|---|---|---|
| | 1 transport block | 2 transport blocks |
| AUL C-RNTI | 16 | 16 |
| HARQ process number | 4 | 4 |
| Repetition RV | 2 | 2 |
| New data indicator | 1 | 2 |
| PUSCH starting symbol | 1 | 1 |
| PUSCH ending symbol | 1 | 1 |
| Channel Occupancy Time (COT) sharing indication | 1 | 1 |
| Repetition K | 2 | 2 |

TABLE 3

Example of Repetition K field

| Repetition K field value | Applied K value |
|---|---|
| 00 | 1 |
| 01 | 2 |
| 10 | 4 |
| 11 | 8 |

TABLE 4

Example of Repetition RV field (K > 1)

| Repetition RV value | Applied RV sequence value |
|---|---|
| 00 | {0, 2, 3, 1} |
| 01 | {0, 3, 0, 3} |
| 10 | {0, 0, 0, 0} |
| 11 | reserved |

Exemplary Methods

According to one aspect of the present disclosure, a wireless communication method for a terminal comprises: receiving resource configuration information by at least one of radio resource control (RRC) signaling and physical layer signaling, wherein the resource configuration information indicates allocated resources in non-licensed spectrum for uplink transmission by the terminal. The resources comprise one or more resources, and the resource configuration information comprises information of one or more offsets indicating positions of the one or more resources.

In one embodiment, the resources correspond to one or more periods, wherein at least one period has a starting point and an ending point, the resource configuration information further indicates one or more offsets relative to the starting point of the at least one period.

In one embodiment, the method further comprises: performing channel clear assessment (CCA) prior to the starting point of the at least one period; if the CCA is successful, the resources are used from the starting point on; otherwise, the CCA is performed prior to each offset until the CCA is successful or all offsets are past.

In one embodiment, the one or more offsets are indicated by amounts of offset time relative to the starting point or a particular reference time.

In one embodiment, the ending point of the at least one period is fixed, or the ending point of the at least one period is variable.

In one embodiment, receiving resource configuration information by at least one of RRC signaling and physical layer signaling comprises at least one of the following: receiving information about the starting point, ending point and offsets of the at least one period by RRC signaling; receiving information about the starting point, ending point and offsets of the at least one period by physical layer signaling; or receiving information about the starting point and the ending point of the at least one period by RRC signaling, and receiving information about the offsets of the at least one period by physical layer signaling.

In one embodiment, the method further comprises: receiving, from a Base Station (BS), an authorization to use an operating channel during a channel occupancy time of the BS; and performing at least one of the following: directly performing uplink transmission by using the operating channel at any time in a first period after the transmission from the BS ends; or performing CCA for the operating channel after the first period, and perform uplink transmission by using the operating channel after the CCA succeeds.

In one embodiment, the method further comprises: transmitting an authorization to use an operating channel to a Base Station (BS) during a channel occupancy time of the terminal; and performing at least one of the following: directly performing uplink transmission by using the operating channel at any time in a first period after the transmission from the BS ends; or performing CCA for the operating channel after the first period, and performing uplink transmission by using the operating channel after the CCA succeeds.

In one embodiment, the CCA performed for the operating channel corresponds to type 2 Listen Before Talk (LBT).

In one embodiment, if the uplink transmission after end of the transmission from the BS is control information, the CCA corresponds to one type 2 LBT; and/or if the uplink transmission after end of the transmission from the BS is data, the CCA corresponds to two or more type 2 LBTs.

In one embodiment, the method further comprises: performing the following operations for channel access in non-licensed spectrum configured with Frame-Based Equipment (FBE): receiving a synchronization signal and/or reference signal; and/or transmitting a measurement report to a Base Station (BS).

According to one aspect of the present disclosure, a wireless communication method for a base station comprises: transmitting resource configuration information by at least one of radio resource control (RRC) signaling and physical layer signaling, wherein the resource configuration information indicates allocated resources in non-licensed spectrum for uplink transmission by a terminal. Wherein, the resources comprise one or more resources, and the resource configuration information comprises information of one or more offsets indicating positions of the one or more resources.

In one embodiment, the resources correspond to one or more periods, wherein at least one period has a starting point and an ending point, the resource configuration information further indicates one or more offsets relative to the starting point of the at least one period.

In one embodiment, the one or more offsets are indicated by amounts of offset time relative to the starting point or a particular reference time.

In one embodiment, the ending point of the at least one period is fixed, or the ending point of the at least one period is variable.

In one embodiment, transmitting resource configuration information by at least one of RRC signaling and physical layer signaling comprises at least one of the following: transmitting information about the starting point, ending point and offsets of the at least one period by RRC signaling; transmitting information about the starting point, ending point and offsets of the at least one period by physical layer signaling; or transmitting information about the starting point and the ending point of the at least one period by RRC signaling, and transmitting information about the offsets of the at least one period by physical layer signaling.

In one embodiment, the method further comprises: receiving, from the terminal, an authorization to use an operating channel during a channel occupancy time of the terminal; and performing at least one of the following: directly performing downlink transmission by using the operating channel at any time in a first period after the transmission from the terminal ends; or performing CCA for the operating channel after the first period, and perform downlink transmission by using the operating channel after the CCA succeed.

In one embodiment, the method further comprises: transmitting an authorization to use an operating channel to the terminal during a channel occupancy time of the base station; and performing at least one of the following: directly performing downlink transmission by using the operating channel at any time in a first period after the transmission from the terminal ends; or performing CCA for the operating channel after the first period, and perform downlink transmission by using the operating channel after the CCA succeeds.

In one embodiment, the CCA performed for the operating channel corresponds to type 2 Listen Before Talk (LBT).

In one embodiment, if the downlink transmission after the end of the transmission from the terminal is control information, the CCA corresponds to one type 2 LBT; and/or if the downlink transmission after end of the transmission from the terminal is data, the CCA corresponds to two or more type 2 LBTs.

In one embodiment, the method further comprises performing the following operations for channel access in non-licensed spectrum configured with Frame-Based Equipment (FBE): transmitting a synchronization signals and/or reference signal; and/or receiving a measurement report from the terminal.

According to one aspect of the present disclosure, a wireless communication method for a terminal comprises: generating a parameter K for the number of repetitive transmissions of the same transport block in uplink; transmitting the parameter K to a Base Station (BS); and repetitively transmitting at least one transport block by K times.

In one embodiment, the method further comprises: repetitively transmitting the at least one transport block by K times based on a Redundancy Version (RV) parameter information for repetitive transmissions configured by the base station; or generating the RV parameter information for repetitive transmissions, transmit the generated RV parameter information to the base station, and repetitively transmit at least one transport block by K times based on the generated RV parameter information.

In one embodiment, the method further comprises generating the parameter K based on at least one or more of: the maximum channel occupancy time of the terminal; the charge level of the terminal; or uplink channel status.

In one embodiment, repetitively transmitting the at least one transport block by K times comprises: repetitively transmitting initial transmission of the Hybrid Automatic Repeat Request (HARQ) of the at least one transport block by K times; and/or repetitively transmitting at least one HARQ retransmission of the at least one transport block by K times.

In one embodiment, the method further comprises: for at least one HARQ process of uplink transmission, selecting an HARQ ID for the at least one HARQ process from a plurality of HARQ IDs, wherein the selected HARQ ID is not related to a specific resource; and transmitting the HARQ ID for the at least one HARQ process to the base station.

According to one aspect of the present disclosure, a wireless communication method for a base station comprises: receiving a parameter K for the number of repetitive transmissions of the same transport block in uplink from a terminal; and receiving K repetitive transmissions of at least one transport block from the terminal.

In an embodiment, the method further comprises: decoding the K repetitive transmissions of the at least one transport block based on a Redundancy Version (RV) parameter information for repetitive transmissions configured by the base station; or receiving the RV parameter information from the terminal, and decode the K repetitive transmissions of the at least one transport block based on the received RV parameter information.

In one embodiment, receiving K times repetitive transmissions of at least one transport block from the terminal comprises: receiving K repetitive transmissions of initial transmission of the Hybrid Automatic Repeat Request (HARQ) of the at least one transport block, and decoding the at least one transport block from the received K repetitive transmissions; or receiving K repetitive transmissions of at least one HARQ retransmission of the at least one transport block, and decoding the at least one transport block from the received K transmissions and previous transmissions.

In one embodiment, the method further comprises receiving an HARQ ID for at least one HARQ process of uplink from the terminal, wherein the HARQ ID is not related to a specific resource.

The exemplary electronic devices and methods according to embodiments of the present disclosure are described above. It should be understood that the operations or functions of these electronic devices can be combined with each other to achieve more or less operations or functions than described. The operation steps of the methods can also be combined with each other in any appropriate order, so as to similarly achieve more or less operations than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can comprise, but is not limited to, a floppy disk, an optical disk, a magneto-optical disk, a memory card, a memory stick, and the like.

Figure 11:
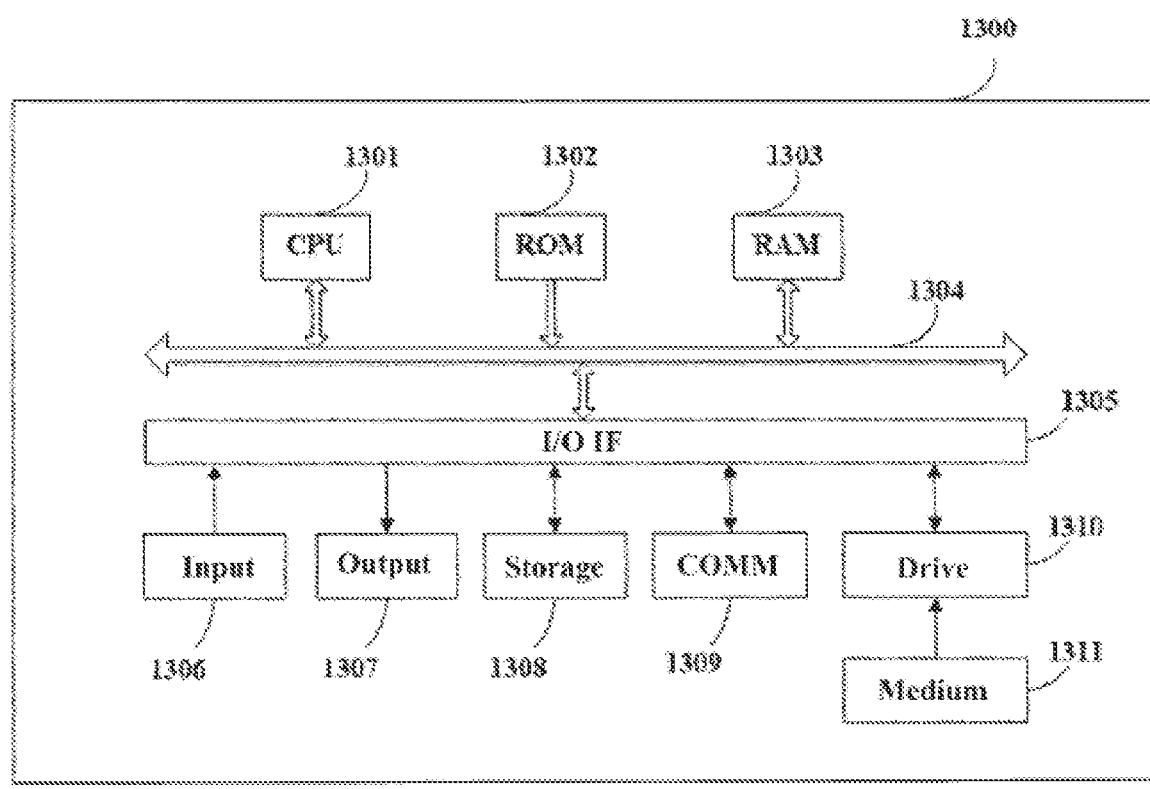
FIG. 11 is a block diagram of an example structure of a personal computer as an information processing device that can be adopted in an embodiment of the present disclosure.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG. 11, which, when is installed with various programs, can execute various functions and so on. FIG. 11 is a block diagram showing an example structure of a personal computer which can be employed as an information processing device in the embodiment herein. In one example, the personal computer can correspond to the above-described exemplary terminal device in accordance with the present disclosure.

In FIG. 11, a central processing unit (CPU) 1301 executes various processes in accordance with a program stored in a read-only memory (ROM) 1302 or a program loaded from storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.; an output unit 1307 including a display such as a cathode ray tube (CRT), a liquid crystal display (LCD), etc., and a speaker, etc.; the storage 1308 including a hard disk etc.; and a communication unit 1309 including a network interface card such as a LAN card, a modem, etc. The communication unit 1309 performs communication processing via a network such as the Internet.

The driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG. 11 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (gNB), such as a macro gNB and a small gNB. The small gNB can be an gNB covering a cell smaller than the macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as a user device in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user device may also be implemented as a terminal that performs machine-to-machine (M2M) communication (also referred to as a machine type communication (MTC) terminal). Further, the user device may be a radio communication module (such as an integrated circuit module including a single wafer) installed on each of the above terminals.

Hereinafter, application examples according to the present disclosure will be described with reference to FIGS. 12 to 15.

Application Examples for Base Stations

The First Application Example

Figure 12:
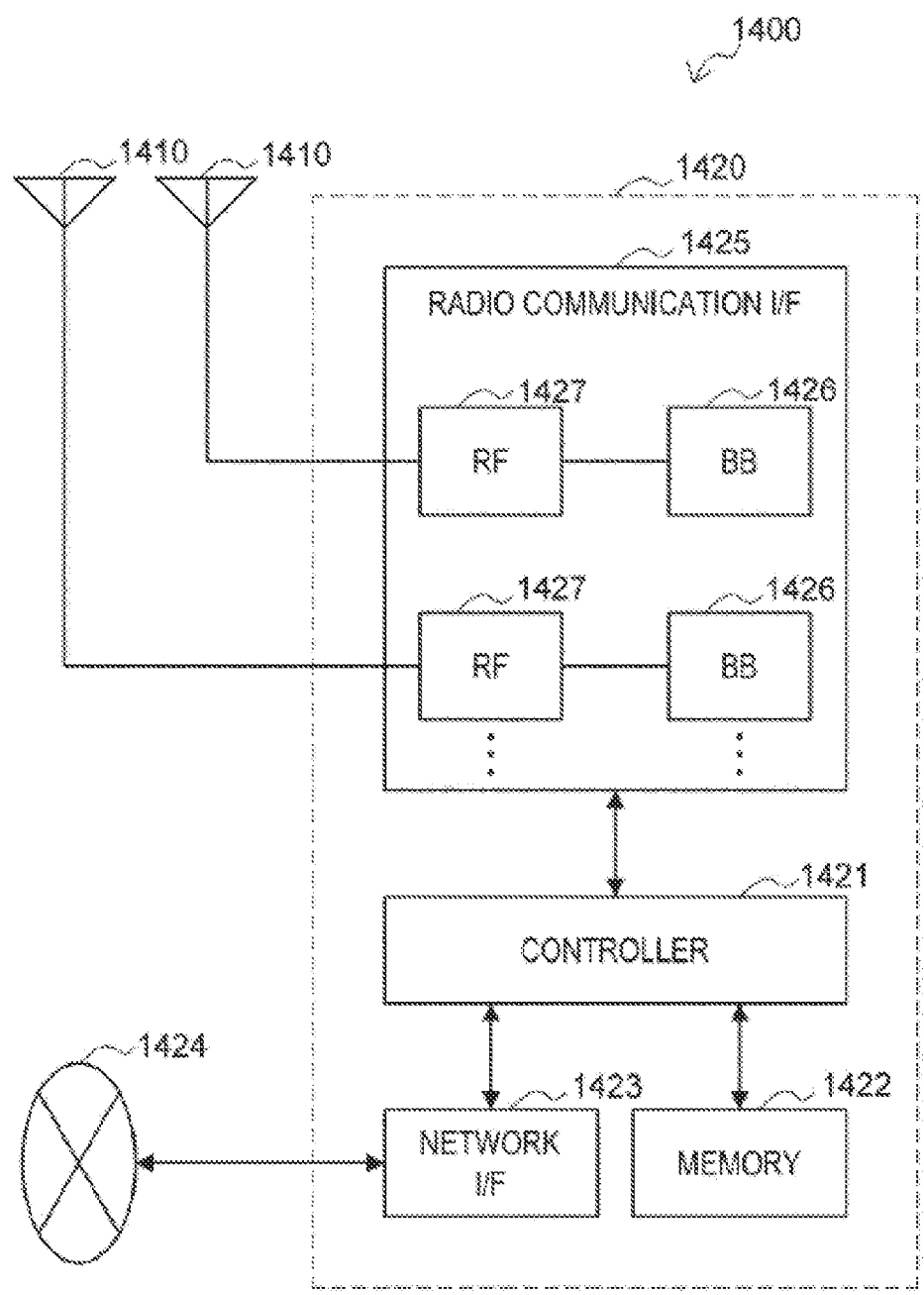
FIG. 12 is a block diagram showing a first example of a schematic configuration of a gNB to which the technology of the present disclosure can be applied.

FIG. 12 is a block diagram showing a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 12, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the gNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 12 shows an example in which one RF circuit 1427 is connected to one antenna 1410, the present disclosure is not limited to thereto; rather, one RF circuit 1427 may connect to a plurality of antennas 1410 at the same time.

As shown in FIG. 12, the radio communication interface 1425 may include the multiple BB processors 1426. For example, the multiple BB processors 1426 may be compatible with multiple frequency bands used by gNB 1400. As shown in FIG. 12, the radio communication interface 1425 may include the multiple RF circuits 1427. For example, the multiple RF circuits 1427 may be compatible with multiple antenna elements. Although FIG. 12 shows the example in which the radio communication interface 1425 includes the multiple BB processors 1426 and the multiple RF circuits 1427, the radio communication interface 1425 may also include a single BB processor 1426 or a single RF circuit 1427.

Second Application Example

Figure 13:
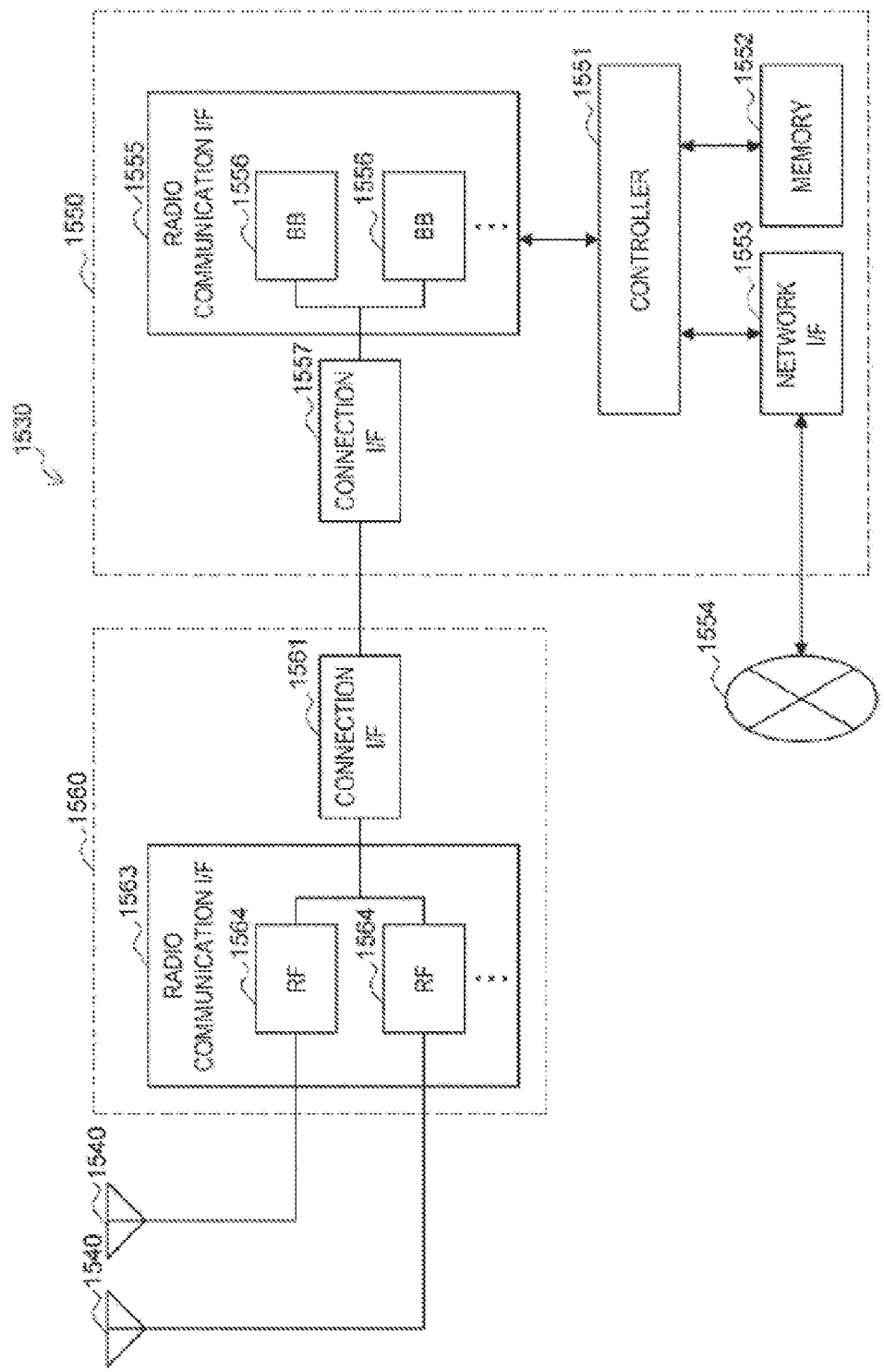
FIG. 13 is a block diagram showing a second example of a schematic configuration of a gNB to which the technology of the present disclosure can be applied.

FIG. 13 is a block diagram showing a second example of a schematic configuration of a gNB to which the technology of the present disclosure may be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic devices 300A, 1300A, and/or 1500B described above.

Each of the antennas 1540 includes a single or multiple antenna elements such as multiple antenna elements included in a MIMO antenna and is used for the RRH 1560 to transmit and receive radio signals. The gNB 1530 may include multiple antennas 1540, as shown in FIG. 13. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 12.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 12, except that the BB processor 1556 is connected to the RF circuit 1564 of the RRH 1560 via the connection interface 1557. The radio communication interface 1555 may include the multiple BB processors 1556, as shown in FIG. 13. For example, the multiple BB processors 1556 may be compatible with multiple frequency bands used by the gNB 1530. Although FIG. 13 shows the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 13 shows the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as shown in FIG. 13. For example, multiple RF circuits 1564 may support multiple antenna elements. Although FIG. 13 shows the example in which the radio communication interface 1563 includes the multiple RF circuits 1564, the radio communication interface 1563 may also include a single RF circuit 1564.

Application Examples Related to User Devices (Terminals)

The First Application Example

Figure 14:
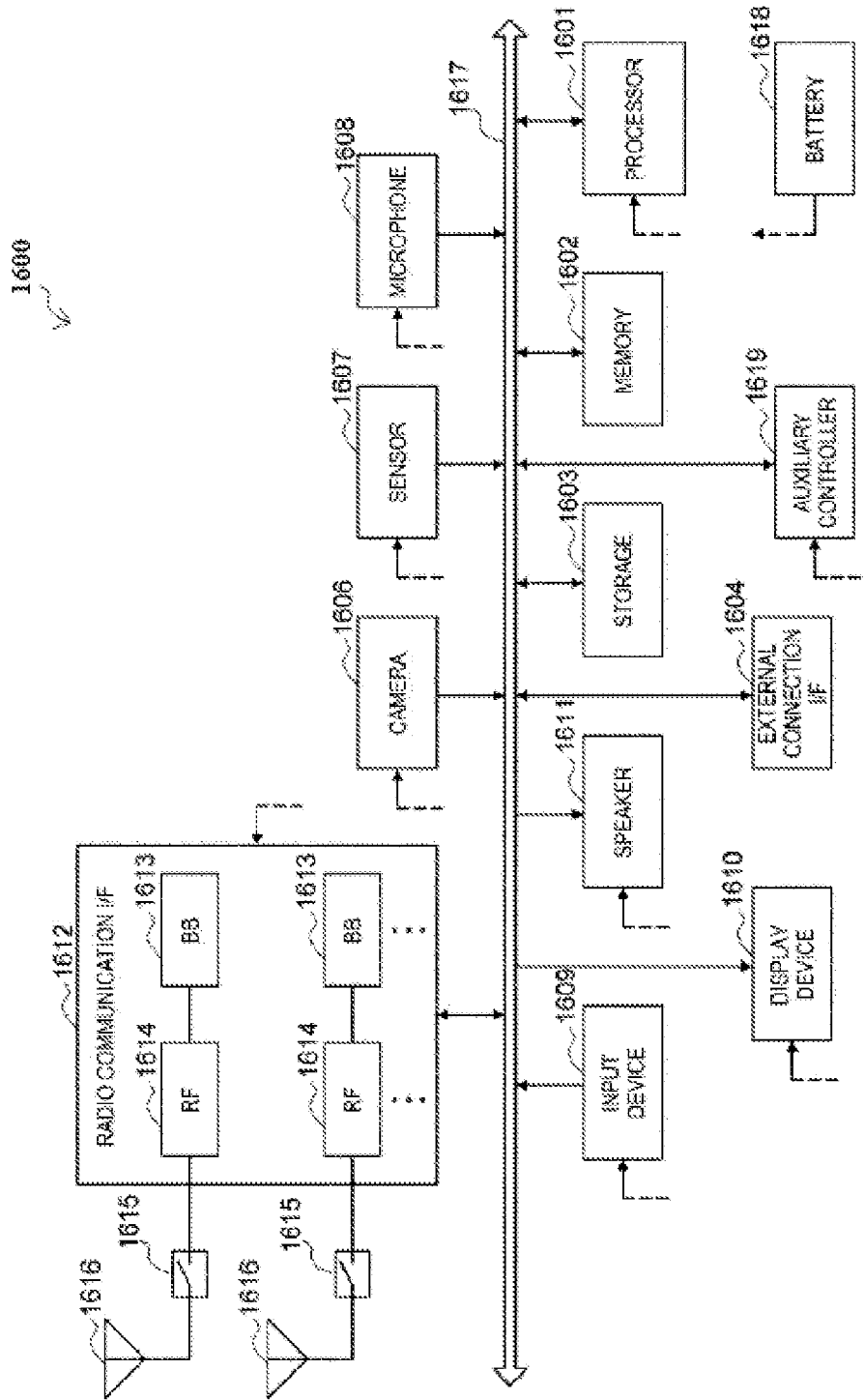
FIG. 14 is a block diagram showing an example of a schematic configuration of a smart phone to which the technology of the present disclosure can be applied.

FIG. 14 is a block diagram showing an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to terminal device 300B and/or 1500A described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one-chip module that integrates the BB processor 1613 and the RF circuit 1614 thereon. The radio communication interface 1612 may include multiple BB processors 1613 and multiple RF circuits 1614, as shown in FIG. 14. Although FIG. 14 shows the example in which the radio communication interface 1612 includes multiple BB processors 1613 and multiple RF circuits 1614, the radio communication interface 1612 may also include a single BB processor 1613 or a single RF circuit 1614.

In addition, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as shown in FIG. 14. Although FIG. 14 shows the example in which the smartphone 1600 includes multiple antennas 1616, the smartphone 1600 may also include a single antenna 1616.

In addition, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 shown in FIG. 14 via feeder lines, which are partially shown as a dashed line in the figure. The auxiliary controller 1619 operates a minimum necessary function of the smartphone 1600, for example, in a sleep mode.

The Second Application Example

Figure 15:
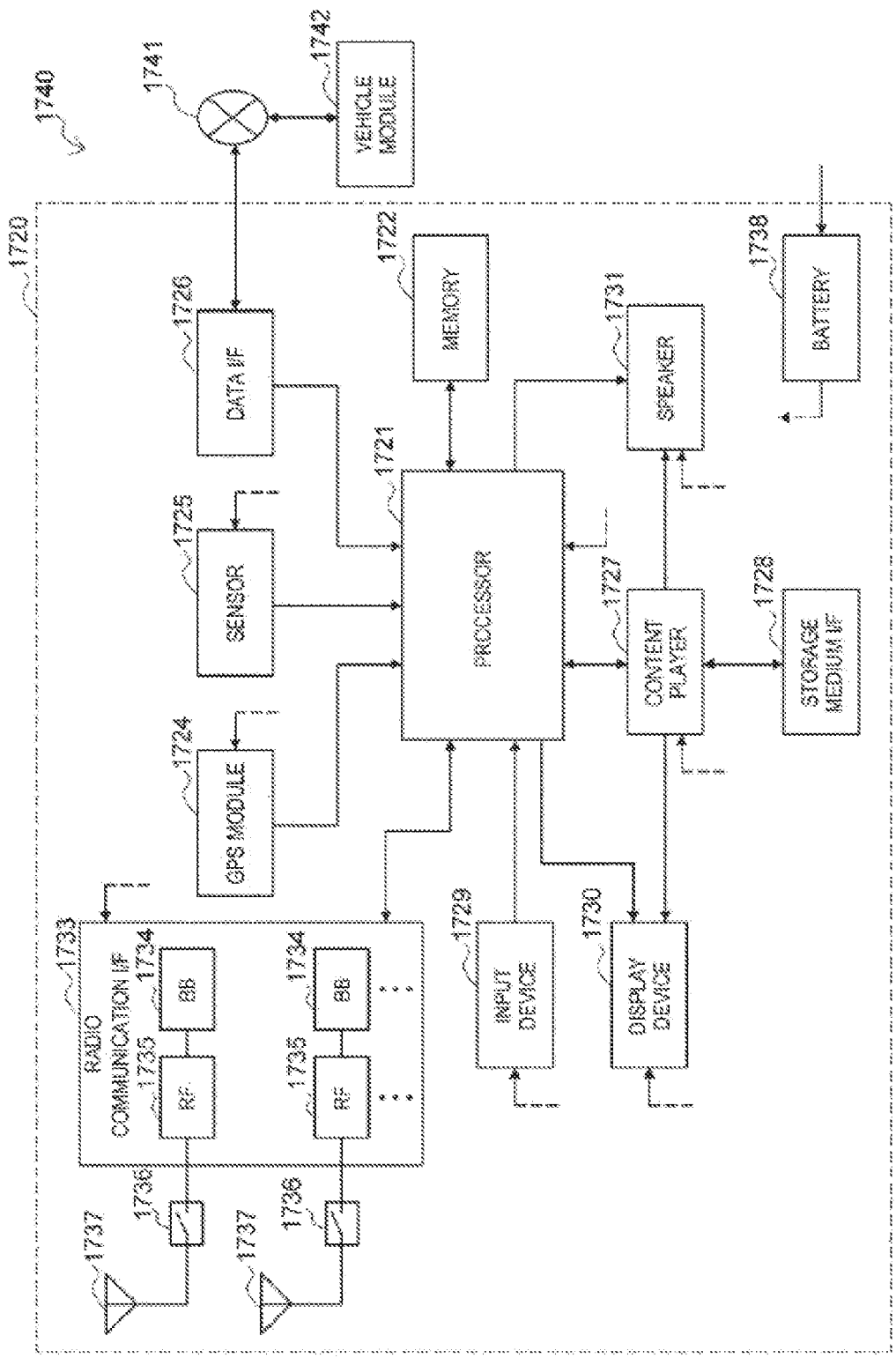
FIG. 15 is a block diagram showing an example of a schematic configuration of a car navigation device to which the technology of the present disclosure can be applied.

FIG. 15 is a block diagram showing an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, car navigation device 1720 (or processor 1721) herein may correspond to terminal device 300B and/or 1500A described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one-chip module which integrates the BB processor 1734 and the RF circuit 1735 thereon. The radio communication interface 1733 may include multiple BB processors 1734 and multiple RF circuits 1735, as shown in FIG. 15. Although FIG. 15 shows the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as shown in FIG. 15. Although FIG. 15 shows the example in which the car navigation device 1720 includes multiple antennas 1737, the car navigation device 1720 may also include a single antenna 1737.

In addition, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 shown in FIG. 15 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

Although the illustrative embodiments herein have been described with reference to the accompanying drawings, the present disclosure is certainly not limited to the above examples. Those skilled in the art can achieve various adaptations and modifications within the scope of the appended claims, and it will be appreciated that these adaptations and modifications certainly fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In additions, one of the above functions can be implemented by multiple units. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Various exemplary embodiments of the present disclosure can be implemented in the manner described in the following clauses:

Clause 1. An electronic device for a terminal in a wireless communication system, comprising a processing circuitry configured to:
receive resource configuration information by at least one of radio resource control (RRC) signaling and physical layer signaling, wherein the resource configuration information indicates allocated resources in non-licensed spectrum for uplink transmission by the terminal, and
wherein the resources comprise one or more resources, and the resource configuration information comprises information of one or more offsets indicating positions of the one or more resources.

Clause 2. The electronic device of clause 1, wherein the resources correspond to one or more periods, wherein at least one period has a starting point and an ending point, the resource configuration information further indicates one or more offsets relative to the starting point of the at least one period, and the processing circuitry is further configured to:
perform channel clear assessment (CCA) prior to the starting point of the at least one period; and
if the CCA is successful, the resources are used from the starting point on; otherwise, the CCA is performed prior to each offset until the CCA is successful or all offsets are past.

Clause 3. The electronic device of clause 2, wherein the one or more offsets are indicated by amounts of offset time relative to the starting point or a particular reference time.

Clause 4. The electronic device of clause 3, wherein the ending point of the at least one period is fixed, or the ending point of the at least one period is variable.

Clause 5. The electronic device of clause 3, wherein receiving resource configuration information by at least one of RRC signaling and physical layer signaling comprises at least one of the following:
receiving information about the starting point, ending point and offsets of the at least one period by RRC signaling;
receiving information about the starting point, ending point and offsets of the at least one period by physical layer signaling; or
receiving information about the starting point and the ending point of the at least one period by RRC signaling, and receiving information about the offsets of the at least one period by physical layer signaling.

Clause 6. The electronic device of clause 1, wherein the processing circuitry is further configured to:
receive, from a Base Station (BS), an authorization to use an operating channel during a channel occupancy time of the BS; and
perform at least one of the following:
directly perform uplink transmission by using the operating channel at any time in a first period after the transmission from the BS ends; or
perform CCA for the operating channel after the first period, and perform uplink transmission by using the operating channel after the CCA succeeds.

Clause 7. The electronic device of clause 1, wherein the processing circuitry is further configured to:
transmit an authorization to use an operating channel to a Base Station (BS) during a channel occupancy time of the terminal; and
perform at least one of the following:
directly perform uplink transmission by using the operating channel at any time in a first period after the transmission from the BS ends; or perform CCA for the operating channel after the first period, and perform uplink transmission by using the operating channel after the CCA succeeds.

Clause 8. The electronic device of clause 6 or clause 7, wherein the CCA performed for the operating channel corresponds to type 2 Listen Before Talk (LBT).

Clause 9. The electronic device of clause 8, wherein if the uplink transmission after end of the transmission from the BS is control information, the CCA corresponds to one type 2 LBT; and/or if the uplink transmission after end of the transmission from the BS is data, the CCA corresponds to two or more type 2 LBTs.

Clause 10. The electronic device of clause 1, wherein the processing circuitry is further configured to perform the following operations for channel access in non-licensed spectrum configured with Frame-Based Equipment (FBE):
  receive a synchronization signal and/or reference signal; and/or
  transmit a measurement report to a Base Station (BS).

Clause 11. An electronic device for a base station in a wireless communication system, comprising a processing circuitry configured to:
  transmit resource configuration information by at least one of radio resource control (RRC) signaling and physical layer signaling, wherein the resource configuration information indicates allocated resources in non-licensed spectrum for uplink transmission by a terminal, wherein the resources comprise one or more resources, and the resource configuration information comprises information of one or more offsets indicating positions of the one or more resources.

Clause 12. The electronic device of clause 11, wherein the resources correspond to one or more periods, wherein at least one period has a starting point and an ending point, the resource configuration information further indicates one or more offsets relative to the starting point of the at least one period, and the one or more offsets are indicated by amounts of offset time relative to the starting point or a particular reference time.

Clause 13. The electronic device of clause 12, wherein the ending point of the at least one period is fixed, or the ending point of the at least one period is variable.

Clause 14. The electronic device of clause 12, wherein transmitting resource configuration information by at least one of RRC signaling and physical layer signaling comprises at least one of the following:
  transmitting information about the starting point, ending point and offsets of the at least one period by RRC signaling;
  transmitting information about the starting point, ending point and offsets of the at least one period by physical layer signaling; or
  transmitting information about the starting point and the ending point of the at least one period by RRC signaling, and transmitting information about the offsets of the at least one period by physical layer signaling.

Clause 15. The electronic device of clause 11, wherein the processing circuitry is further configured to:
  receive, from the terminal, an authorization to use an operating channel during a channel occupancy time of the terminal; and
  perform at least one of the following:
  directly perform downlink transmission by using the operating channel at any time in a first period after the transmission from the terminal ends; or
  perform CCA for the operating channel after the first period, and perform downlink transmission by using the operating channel after the CCA succeed.

Clause 16. The electronic device of clause 11, wherein the processing circuitry is further configured to:
  transmit an authorization to use an operating channel to the terminal during a channel occupancy time of the base station; and
  perform at least one of the following:
  directly perform downlink transmission by using the operating channel at any time in a first period after the transmission from the terminal ends; or
  perform CCA for the operating channel after the first period, and perform downlink transmission by using the operating channel after the CCA succeeds.

Clause 17. The electronic device of clause 15 or clause 16, wherein the CCA performed for the operating channel corresponds to type 2 Listen Before Talk (LBT).

Clause 18. The electronic device of clause 17, wherein if the downlink transmission after the end of the transmission from the terminal is control information, the CCA corresponds to one type 2 LBT; and/or
  if the downlink transmission after end of the transmission from the terminal is data, the CCA corresponds to two or more type 2 LBTs.

Clause 19. The electronic device of clause 11, wherein the processing circuitry is further configured to perform the following operations for channel access in non-licensed spectrum configured with Frame-Based Equipment (FBE):
  transmit a synchronization signals and/or reference signal; and/or
  receive a measurement report from the terminal.

Clause 20. An electronic device for a terminal in a wireless communication system, comprising a processing circuitry configured to:
  generate a parameter K for the number of repetitive transmissions of the same transport block in uplink;
  transmit the parameter K to a Base Station (BS); and
  repetitively transmit at least one transport block by K times.

Clause 21. The electronic device of clause 20, wherein the processing circuitry is further configured to:
  repetitively transmit the at least one transport block by K times based on a Redundancy Version (RV) parameter information for repetitive transmissions configured by the base station; or
  generate the RV parameter information for repetitive transmissions, transmit the generated RV parameter information to the base station, and repetitively transmit at least one transport block by K times based on the generated RV parameter information.

Clause 22. The electronic device of clause 20, wherein the processing circuitry is further configured to generate the parameter K based on at least one or more of:
  the maximum channel occupancy time of the terminal;
  the charge level of the terminal; or
  uplink channel status.

Clause 23. The electronic device of clause 20, wherein repetitively transmitting the at least one transport block by K times comprises:
  repetitively transmitting initial transmission of the Hybrid Automatic Repeat Request (HARQ) of the at least one transport block by K times; and/or
  repetitively transmitting at least one HARQ retransmission of the at least one transport block by K times.

Clause 24. The electronic device of clause 20, wherein the processing circuitry is further configured to:
  for at least one HARQ process of uplink transmission, select an HARQ ID for the at least one HARQ process from a plurality of HARQ IDs, wherein the selected HARQ ID is not related to a specific resource; and
  transmit the HARQ ID for the at least one HARQ process to the base station.

Clause 25. An electronic device for a base station in a wireless communication system, comprising a processing circuitry configured to:
receive a parameter K for the number of repetitive transmissions of the same transport block in uplink from a terminal; and
receive K repetitive transmissions of at least one transport block from the terminal.

Clause 26. The electronic device of clause 25, wherein the processing circuitry is further configured to:
decode the K repetitive transmissions of the at least one transport block based on a Redundancy Version (RV) parameter information for repetitive transmissions configured by the base station; or
receive the RV parameter information from the terminal, and decode the K repetitive transmissions of the at least one transport block based on the received RV parameter information.

Clause 27. The electronic device of clause 25, wherein receiving K times repetitive transmissions of at least one transport block from the terminal comprises:
receiving K repetitive transmissions of initial transmission of the Hybrid Automatic Repeat Request (HARQ) of the at least one transport block, and decoding the at least one transport block from the received K repetitive transmissions; or
receiving K repetitive transmissions of at least one HARQ retransmission of the at least one transport block, and decoding the at least one transport block from the received K transmissions and previous transmissions.

Clause 28. The electronic device of clause 25, wherein the processing circuitry is further configured to:
receive an HARQ ID for at least one HARQ process of uplink from the terminal, wherein the HARQ ID is not related to a specific resource.

Clause 29. A wireless communication method for a terminal, comprising:
receiving resource configuration information by at least one of radio resource control (RRC) signaling and physical layer signaling, wherein the resource configuration information indicates allocated resources in non-licensed spectrum for uplink transmission by the terminal, and
wherein the resources comprise one or more resources, and the resource configuration information comprises information of one or more offsets indicating positions of the one or more resources.

Clause 30. A wireless communication method for a base station, comprising:
transmit resource configuration information by at least one of radio resource control (RRC) signaling and physical layer signaling, wherein the resource configuration information indicates allocated resources in non-licensed spectrum for uplink transmission by a terminal,
wherein the resources comprise one or more resources, and the resource configuration information comprises information of one or more offsets indicating positions of the one or more resources.

Clause 31. A wireless communication method for a terminal, comprising:
generate a parameter K for the number of repetitive transmissions of the same transport block in uplink;
transmit the parameter K to a Base Station (BS); and
repetitively transmit at least one transport block by K times.

Clause 32. A wireless communication method for a base station, comprising:
receive a parameter K for the number of repetitive transmissions of the same transport block in uplink from a terminal; and
receive K repetitive transmissions of at least one transport block from the terminal.

Clause 33. A computer-readable storage medium storing one or more instructions that, when executed by one or more processors of an electronic device, cause the electronic device to execute the methods as described in clauses 29 to 32.

Clause 34. An apparatus for a wireless communication system, comprising a unit for performing the methods as described in clauses 29 to 32.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments herein are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

The invention claimed is:

1. A user equipment in a wireless communication system, comprising a processing circuitry configured to:
receive resource configuration information, from a base station, by at least one of radio resource control (RRC) signaling or physical layer signaling,
wherein the resource configuration information indicates allocated resources in shared spectrum for uplink transmission by the user equipment;
for at least one HARQ process of uplink transmission, select an HARQ ID for the at least one HARQ process from a plurality of HARQ IDs; and
transmit the HARQ ID for the at least one HARQ process to the base station,
wherein the processing circuitry is further configured to:
generate a parameter K for a number of repetitive transmissions of a same transport block in uplink;
transmit the parameter K to the base station; and
repetitively transmit at least one transport block by K times.

2. The user equipment according to claim 1, wherein the selected HARQ ID is not related to a specific resource.

3. The user equipment according to claim 1, wherein the plurality of HARQ IDs is configured and received from the base station.

4. The user equipment according to claim 1, wherein the resources comprise one or more resources, and the resource configuration information comprises information of one or more offsets indicating positions of the one or more resources.

5. The user equipment according to claim 1, wherein the processing circuitry is further configured to:
repetitively transmit the at least one transport block by K times based on a Redundancy Version (RV) parameter information for repetitive transmissions configured by the base station; or generate the RV parameter information for repetitive transmissions, transmit the generated RV parameter information to the base station, and repetitively transmit the at least one transport block by K times based on the generated RV parameter information.

6. The user equipment according to claim 1, wherein the processing circuitry is further configured to generate the parameter K based on at least one or more of:
   a maximum channel occupancy time of the user equipment;
   a charge level of the user equipment; or
   uplink channel status.

7. The user equipment according to claim 1, wherein repetitively transmitting the at least one transport block by K times comprises:
   repetitively transmitting initial transmission of the Hybrid Automatic Repeat Request (HARQ) of the at least one transport block by K times; and/or
   repetitively transmitting at least one HARQ retransmission of the at least one transport block by K times.

8. A base station in a wireless communication system, comprising a processing circuitry configured to:
   transmit resource configuration information, to a user equipment, by at least one of radio resource control (RRC) signaling or physical layer signaling,
   wherein the resource configuration information indicates allocated resources in shared spectrum for uplink transmission by the user equipment; and
   receive an HARQ ID for at least one HARQ process of uplink transmission from the user equipment,
   wherein the HARQ ID is selected from a plurality of HARQ IDs by the user equipment,
   wherein the processing circuitry is further configured to:
   receive a parameter K from the user equipment,
   wherein the parameter K indicates a number of repetitive transmissions of a same transport block in uplink; and
   repetitively receive at least one transport block by K times.

9. The base station according to claim 8, wherein the selected HARQ ID is not related to a specific resource.

10. The base station according to claim 8, wherein the processing circuitry is further configured to configure and transmit the plurality of HARQ Ins to the user equipment.

11. The base station according to claim 8, wherein the resources comprise one or more resources, and the resource configuration information comprises information of one or more offsets indicating positions of the one or more resources.

12. The base station according to claim 8,
   wherein the processing circuitry is further configured to repetitively receive the at least one transport block by K times based on a Redundancy Version (RV) parameter information for repetitive transmissions configured by the base station; or
   wherein the WV parameter information for repetitive transmissions is generated by the user equipment, the processing circuitry is further configured to repetitively receive the generated RV parameter information from the user equipment, and repetitively receive the at least one transport block by K times based on the generated RV parameter information.

13. The base station according to claim 8, wherein the parameter K based is generated by the user equipment based on at least one or more of:
   a maximum channel occupancy time of the user equipment;
   a charge level of the user equipment; or
   uplink channel status.

14. The base station according to claim 8, wherein repetitively receiving the at least one transport block by K times comprises:
   repetitively receiving initial transmission of the Hybrid Automatic Repeat Request (HARQ) of the at least one transport block by K times; and/or
   repetitively receiving at least one HARQ retransmission of the at least one transport block by K times.

15. A method performed by user equipment in a wireless communication system, the method comprising:
   receiving resource configuration information, from a base station, by at least one of radio resource control (RRC) signaling or physical layer signaling,
   wherein the resource configuration information indicates allocated resources in shared spectrum for uplink transmission by the user equipment;
   for at least one HARQ process of uplink transmission, selecting an HARQ ID for the at least one HARQ process from a plurality of HARQ IDs; and
   transmitting the HARQ ID for the at least one HARQ process to the base station,
   wherein the method further comprises:
   generating a parameter K for a number of repetitive transmissions of a same transport block in uplink;
   transmitting the parameter K to the base station; and
   repetitively transmitting at least one transport block by K times.

* * * * *